(12) United States Patent
Matsusaka et al.

(10) Patent No.: US 8,704,937 B2
(45) Date of Patent: Apr. 22, 2014

(54) IMAGING OPTICAL SYSTEM, IMAGING DEVICE, AND DIGITAL APPARATUS

(71) Applicants: Keiji Matsusaka, Osaka (JP); Hiroaki Tanaka, Sakai (JP)

(72) Inventors: Keiji Matsusaka, Osaka (JP); Hiroaki Tanaka, Sakai (JP)

(73) Assignee: Konica Minolta Optics, Inc., Osaka (JP)

( * ) Notice: Subject to any disclaimer, the term of this patent is extended or adjusted under 35 U.S.C. 154(b) by 0 days.

(21) Appl. No.: 13/837,623

(22) Filed: Mar. 15, 2013

(65) Prior Publication Data

US 2013/0335588 A1    Dec. 19, 2013

(30) Foreign Application Priority Data

Apr. 6, 2012    (JP) ................. 2012-087293

(51) Int. Cl.
  *H04N 5/225*    (2006.01)
  *G02B 9/34*     (2006.01)

(52) U.S. Cl.
  USPC .................................. 348/340; 359/771

(58) Field of Classification Search
  CPC .................................................... G03B 13/004
  See application file for complete search history.

(56) References Cited

U.S. PATENT DOCUMENTS

| | | | |
|---|---|---|---|
| 7,907,353 B2 | 3/2011 | Onoda | |
| 2006/0140622 A1 | 6/2006 | Isono | |
| 2007/0008625 A1 | 1/2007 | Park | |
| 2009/0128665 A1 | 5/2009 | Yoneyama | |
| 2010/0020418 A1 | 1/2010 | Onoda | |
| 2010/0046090 A1 | 2/2010 | Okano | |
| 2011/0122510 A1 | 5/2011 | Uchida | |
| 2012/0044404 A1 | 2/2012 | Kubota et al. | |

FOREIGN PATENT DOCUMENTS

| | | |
|---|---|---|
| JP | 2006-184365 | 7/2006 |
| JP | 2007-017984 | 1/2007 |
| JP | 2007-193195 | 2/2007 |
| JP | 2009-122514 | 6/2009 |
| JP | 2009-271357 | 11/2009 |
| JP | 2010 026387 | 2/2010 |
| JP | 2010-049113 | 3/2010 |
| JP | 2011-018031 | 1/2011 |
| JP | 2011 090122 | 5/2011 |
| JP | 2011-227362 | 11/2011 |
| JP | 2012-042840 | 3/2012 |
| JP | 2012-068292 | 4/2012 |

*Primary Examiner* — Albert Cutler
(74) *Attorney, Agent, or Firm* — Cozen O'Connor

(57) ABSTRACT

An imaging optical system, an imaging device, and a digital apparatus have a four lens construction with positive, negative, positive, and negative refractive powers. A surface position at the maximum effective diameter of the second lens element is located on the object side than a surface vertex thereof. The fourth lens element has an inflection point at a position other than the intersection of the optical axis and the fourth lens element. The optical system satisfies the following conditions.

$0.7 < f1/f < 5$ $-0.8 < (RS1+RS2)/(RS1-RS2) < 3$ $-3 < (RS3+RS4)/(RS3-RS4) < 2$ $0.03 < d2/TL < 0.2$ $2W > 72$ $v4 > 50$, and $0.55 < Y/TL < 0.8$ where f1 is a focal length of the first lens element, f is a focal length of the entire optical system, RS1, RS3, RS2, RS4 are curvature radii of the object-side surface and the image-side surface of the first and second lens elements, d2 is an optical axis distance between the first and second lens elements, TL is a total length of the entire optical system, W is a maximum half angle of view, v4 is an Abbe number of the fourth lens element, and Y is a maximum image height.

11 Claims, 16 Drawing Sheets

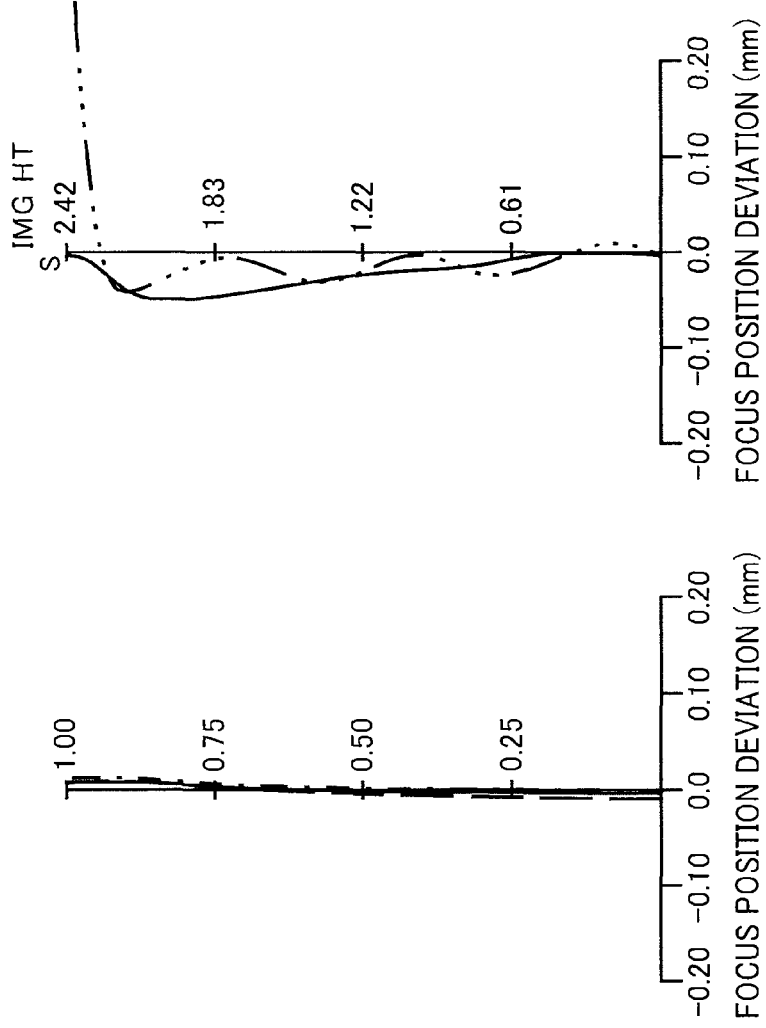

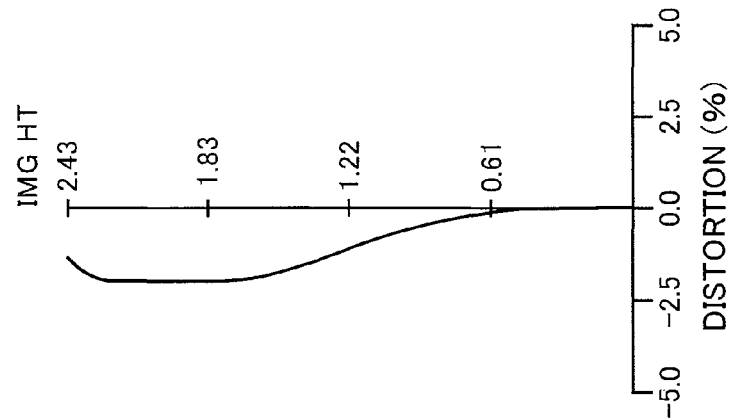
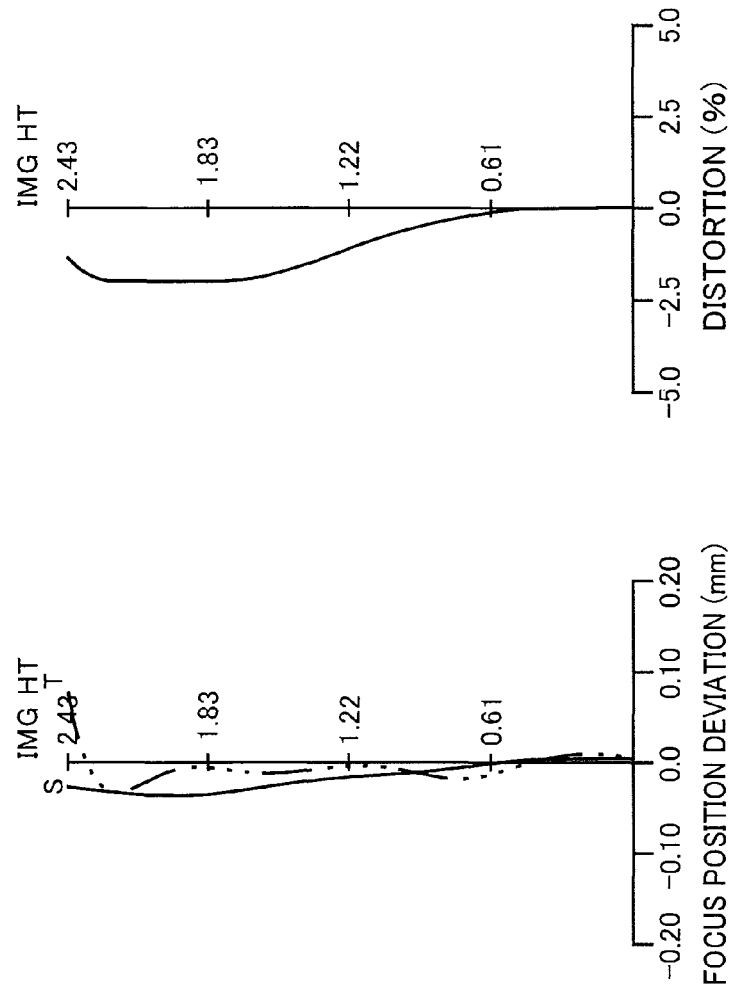
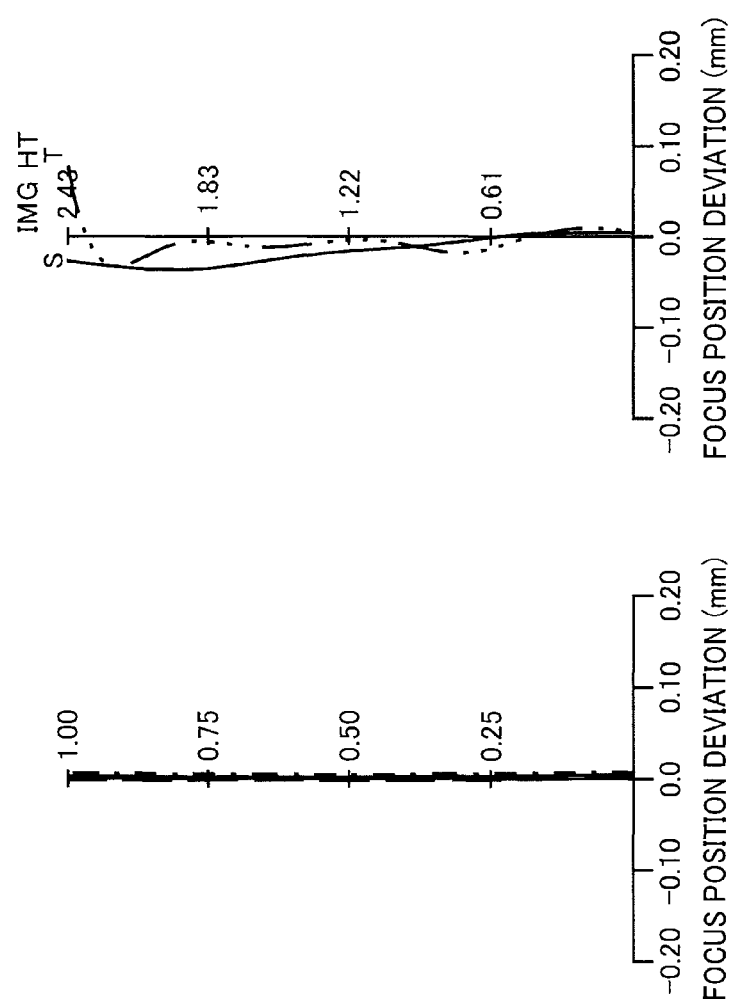

EXAMPLE 3 (AT INFINITE DISTANCE)

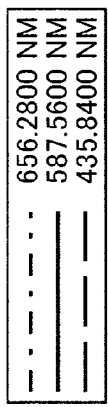
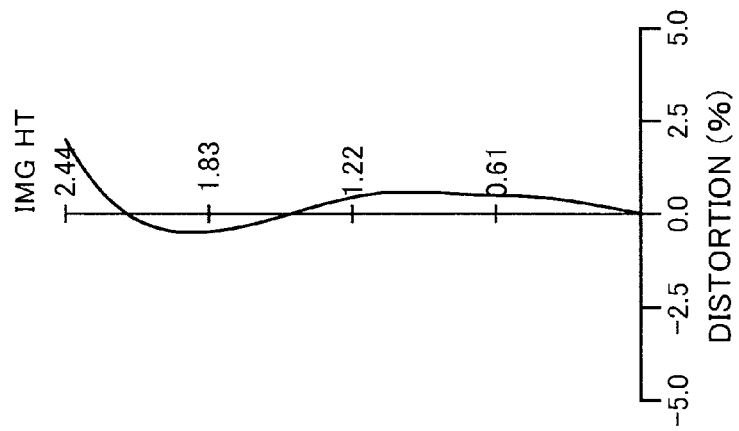
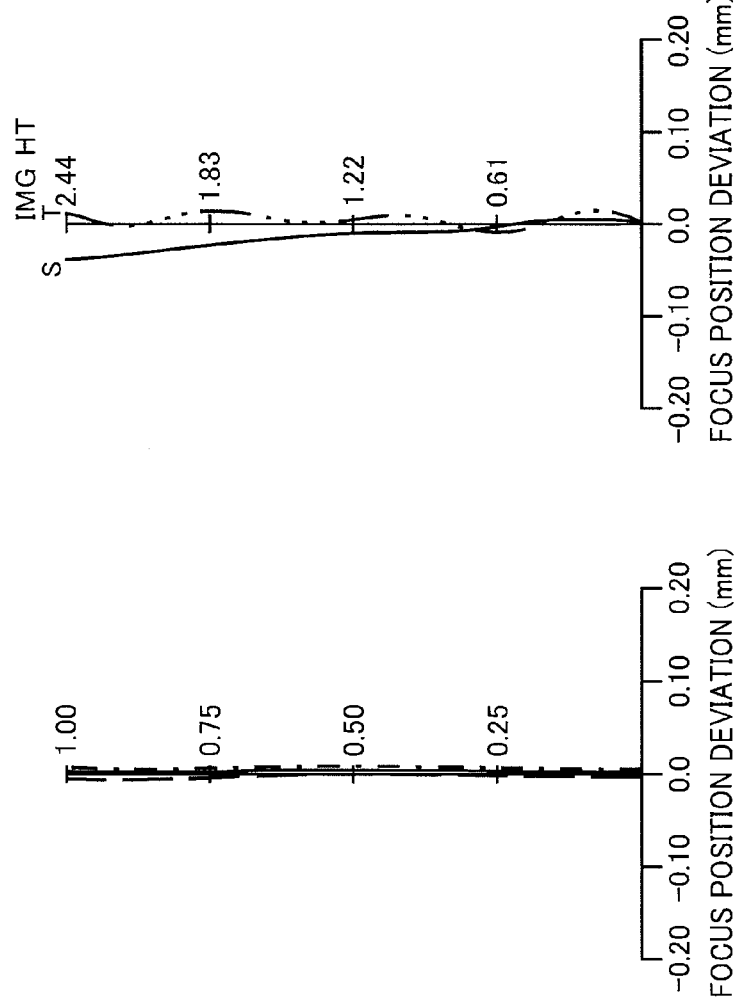
EXAMPLE 4
(AT INFINITE DISTANCE)
FIG. 17A
FIG. 17B
FIG. 17C

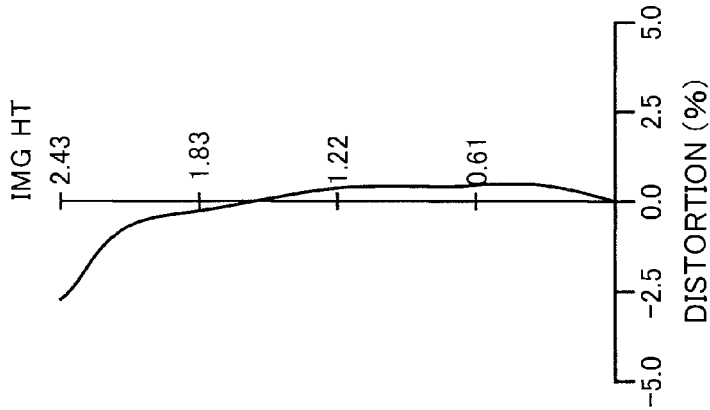
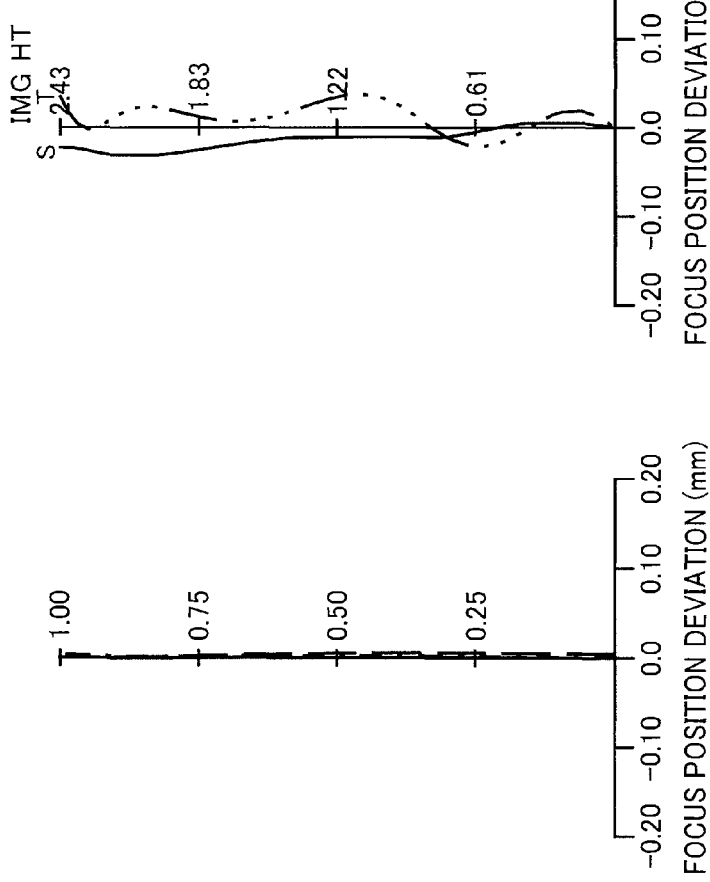

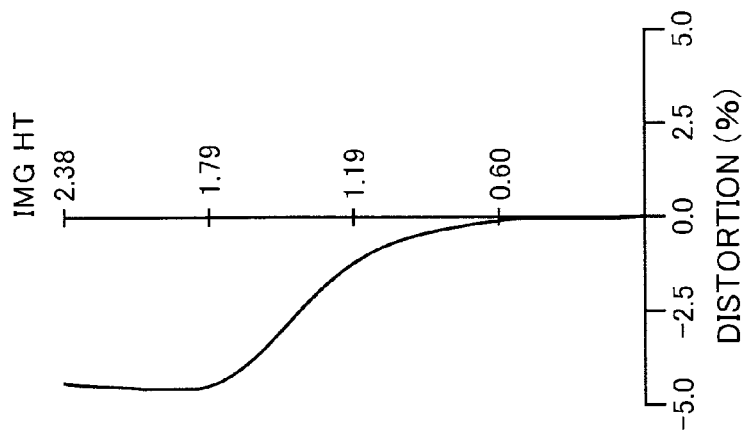
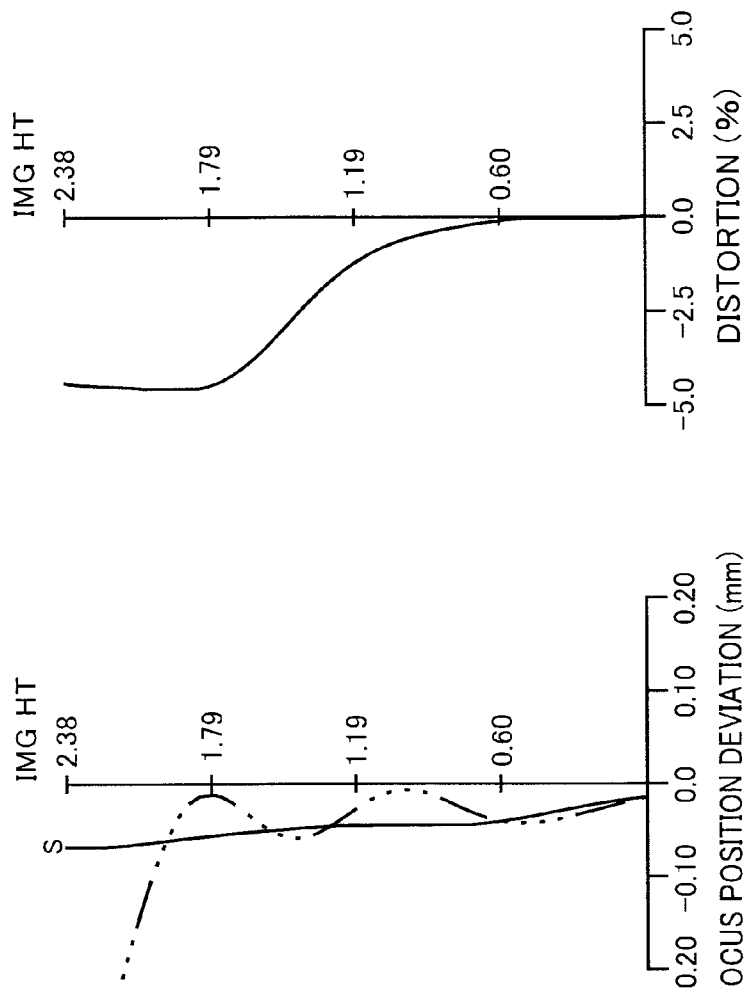
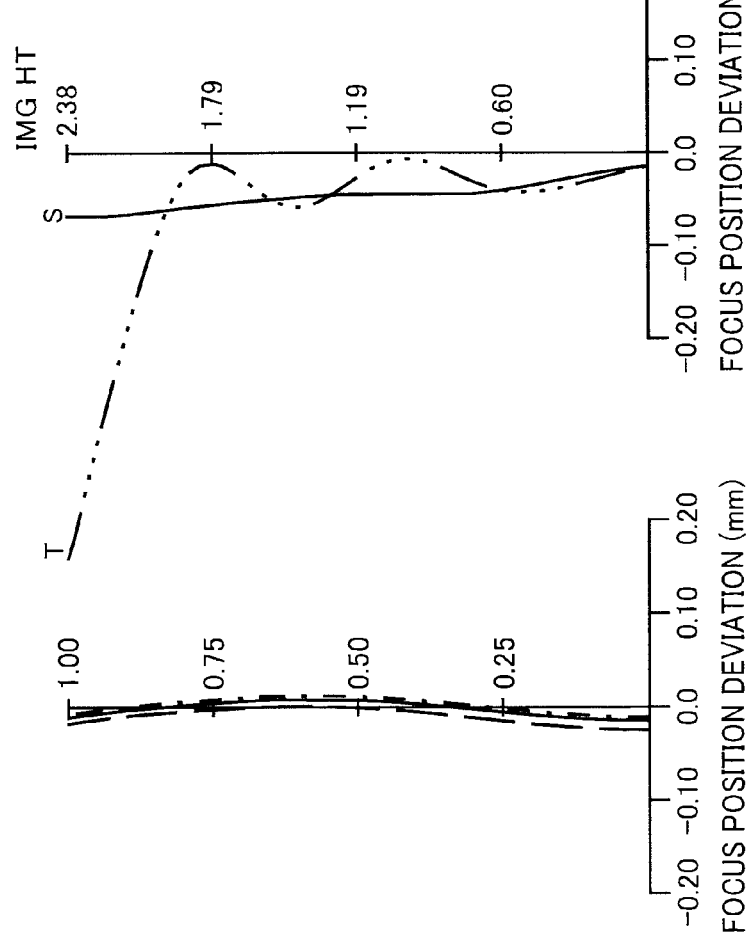

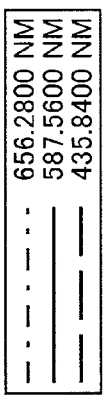
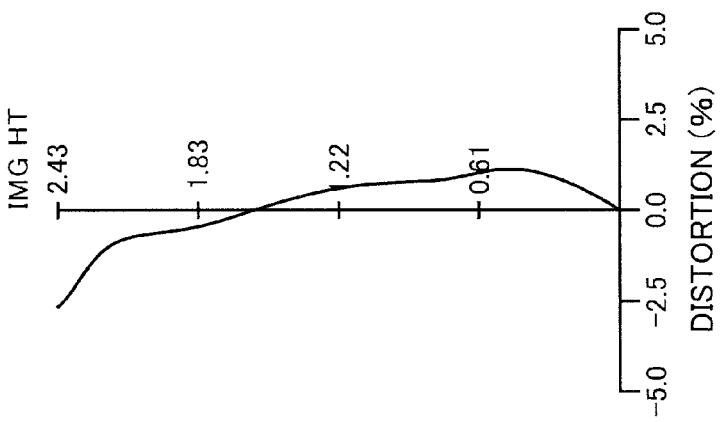
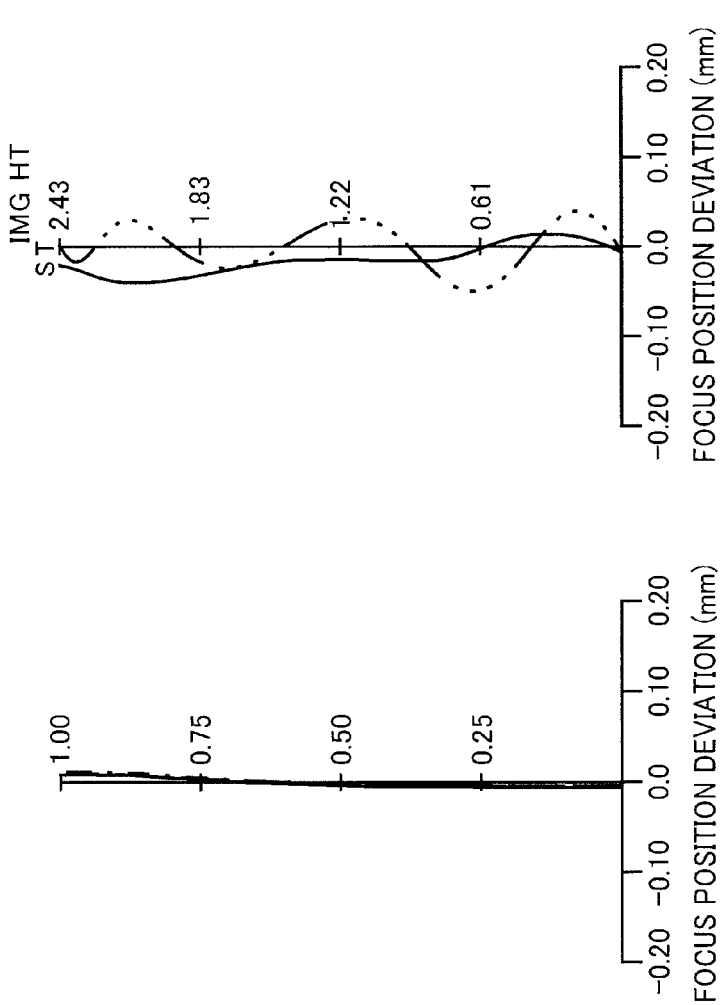

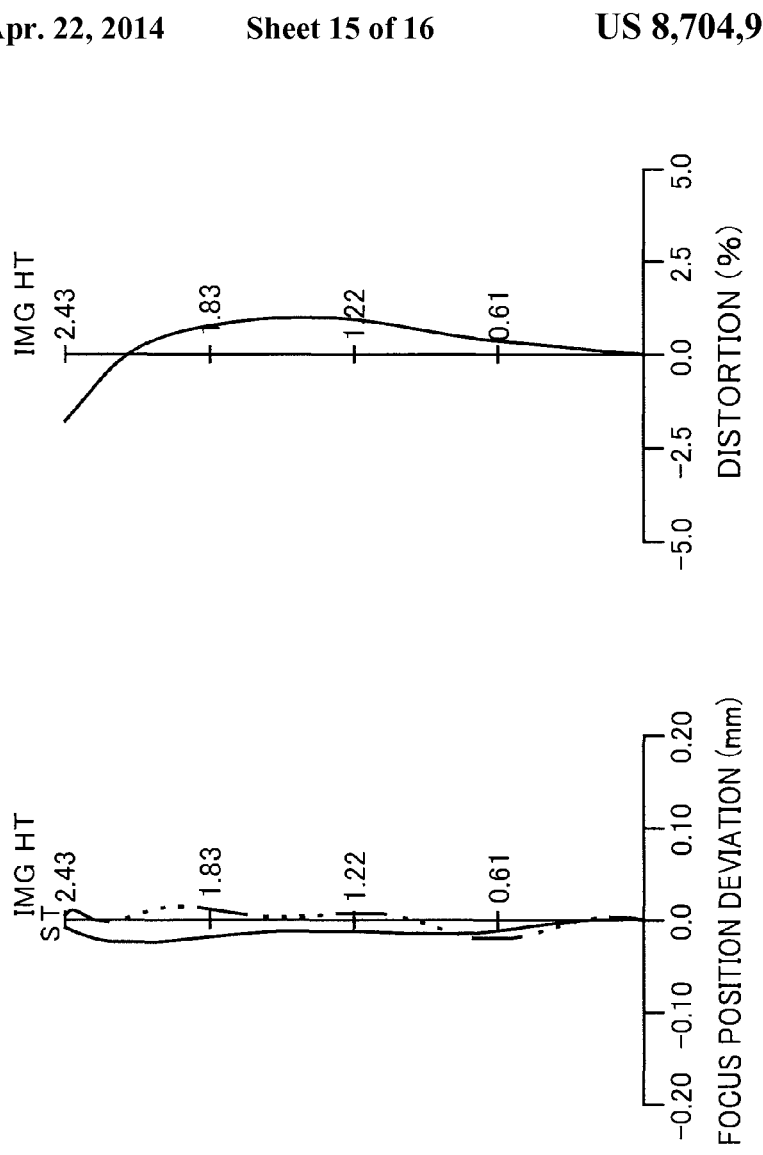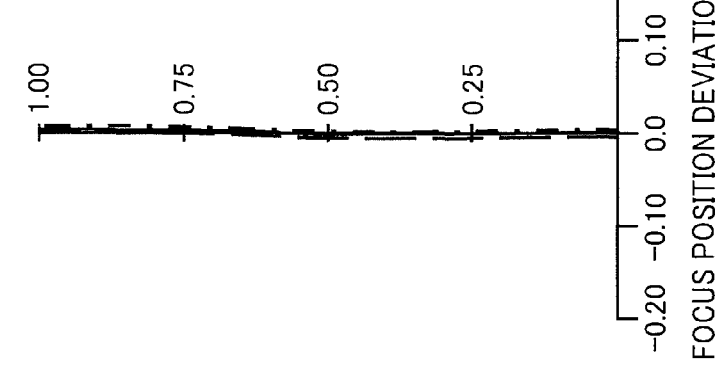

EXAMPLE 9
(AT INFINITE DISTANCE)

IMAGING OPTICAL SYSTEM, IMAGING DEVICE, AND DIGITAL APPARATUS

BACKGROUND OF THE INVENTION

1. Field of the Invention

The present invention relates to an imaging optical system, and more particularly to an imaging optical system suitably applied to a solid-state imaging element such as a CCD image sensor or a CMOS image sensor. The present invention further relates to an imaging device incorporated with the imaging optical system, and a digital apparatus loaded with the imaging device.

2. Description of the Background Art

In recent years, as high performance and miniaturization of an imaging element i.e. a solid-state imaging element such as a CCD (Charged Coupled Device) image sensor or a CMOS (Complementary Metal Oxide Semiconductor) image sensor have developed, digital apparatuses such as mobile phones or personal digital assistants incorporated with an imaging device using such an imaging element have been widely spread. There is also an increasing demand for miniaturization and high performance of an imaging optical system (imaging lens) for forming an optical image of an object on a light receiving surface of the solid-state imaging element to be loaded in such an imaging device.

Japanese Unexamined Patent Publication No. 2010-026387 (patent literature 1) and Japanese Unexamined Patent Publication No. 2011-090122 (patent literature 2) disclose some of the examples of the imaging optical system. The imaging lens disclosed in patent literature 1 is provided with, in the order from an object side, a first lens element having a positive refractive power, an aperture stop for adjusting the light amount, a second lens element having a negative refractive power and concave toward the object side, a third lens element having a positive refractive power and concave toward the object side, and a fourth lens element having a negative refractive power. The imaging lens disclosed in patent literature 2 is constituted of four lens elements, i.e. is constituted of, in the order from the object side, a first lens element having a biconvex shape and having a positive refractive power, a second lens element having a biconcave shape and having a negative refractive power, a third lens element having a meniscus shape concave toward the object side and having a positive refractive power, and a fourth lens element having a negative refractive power. Further, an aperture stop is disposed at a position closest to the object side.

In the imaging lens disclosed in patent literature 1, the first lens element has a large curvature portion (i.e. a portion with a small curvature radius) facing the object side. Accordingly, in the case where the user intends to obtain a wide angle of view with use of the imaging lens, it is difficult to correct comma aberration or chromatic aberration. It is also difficult to shorten the total length of the imaging lens.

Further, in the imaging lens disclosed in patent literature 2, the refractive power (optical power) of the first lens element is extremely strong. This may make error sensitivity extremely high, and may increase the performance variation at the time of assembling into an imaging lens.

SUMMARY OF THE INVENTION

In view of the above, an object of the invention is to provide an imaging optical system capable of advantageously correcting various aberrations, while achieving miniaturization. Another object of the invention is to provide an imaging device incorporated with the imaging optical system, and a digital apparatus loaded with the imaging device.

An imaging optical system of the invention have a four lens construction with positive, negative, positive, and negative refractive powers. The second lens element is configured in such a manner that a surface position at the maximum effective diameter thereof is located on the object side with respect to a surface vertex thereof. The fourth lens element has an inflection point at a position other than the intersection of the optical axis and the fourth lens element. The optical system satisfies the following conditions.

$$0.7 < f1/f < 5$$

$$-0.8 < (RS1+RS2)/(RS1-RS2)/(RS-RS2) < 3$$

$$-3 < (RS3+RS4)/(RS3-RS4) < 2$$

$$0.03 < d2/TL < 0.2$$

$$2W > 72$$

$$v4 > 50$$

$$0.55 < Y/TL < 0.8$$

where
f1 is a focal length of the first lens element,
f is a focal length of the entire optical system,
RS1 and RS3 are curvature radii of the object-side surface of the first and second lens elements,
RS2 and RS4 are curvature radii of the image-side surface of the first and second lens elements,
d2 is an optical axis distance between the first and second lens elements, TL is a total length of the entire optical system,
W is a maximum half angle of view,
v4 is an Abbe number of the fourth lens element, and
Y is a maximum image height.

These and other objects, features and advantages of the present invention will become more apparent upon reading the following detailed description along with the accompanying drawings.

BRIEF DESCRIPTION OF THE DRAWINGS

FIGS. 14A, 14B, 14C are longitudinal aberration diagrams of the imaging optical system as Example 1;

FIGS. 15A, 15B, 15C are longitudinal aberration diagrams of the imaging optical system as Example 2;

FIGS. 17A, 17B, 17C are longitudinal aberration diagrams of the imaging optical system as Example 4;

FIGS. 18A, 18B, 18C are longitudinal aberration diagrams of the imaging optical system as Example 5;

FIGS. 19A, 19B, 19C are longitudinal aberration diagrams of the imaging optical system as Example 6;

FIGS. 20A, 20B, 20C are longitudinal aberration diagrams of the imaging optical system as Example 7;

FIGS. 21A, 21B, 21C are longitudinal aberration diagrams of the imaging optical system as Example 8.

DETAILED DESCRIPTION OF THE PREFERRED EMBODIMENTS

Figure 1:
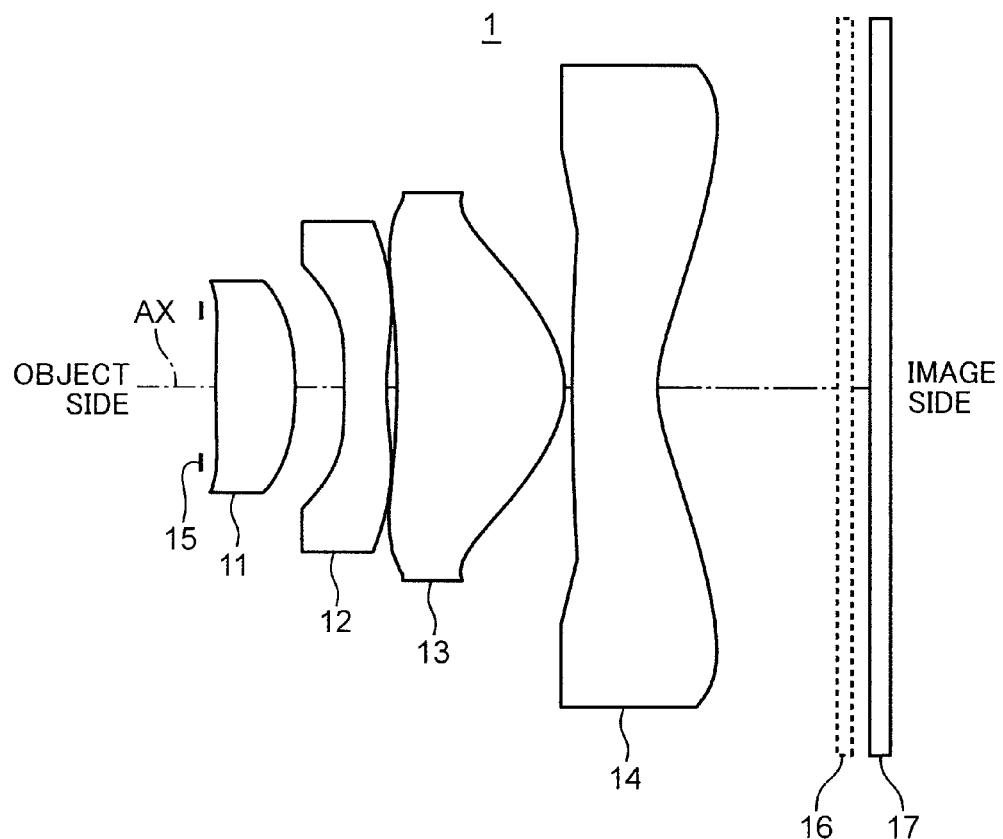
FIG. 1 is a lens sectional view for schematically describing the basic idea about an imaging optical system embodying the invention.

Hereinafter, an embodiment of the invention is described referring to the drawings. Constructions identified by the same reference numerals in the drawings are the same constructions and not repeatedly described unless necessary. The number of lenses in a cemented lens is represented by the number of lens elements composing the cemented lens.

DESCRIPTION ON TERMS

The terms used in the following description are defined as follows in this specification.

(a) A refractive index is the one for a wavelength (587.56 nm) of a d-line.

(b) An Abbe number is an Abbe number vd obtained by the following definitional equation:

$$vd = (nd-1)/(nF-nC)$$

where nd: a refractive index for the d-line, nF: a refractive index for an F-line (wavelength: 486.13 nm), nC: a refractive index for a C-line (wavelength: 656.28 nm), and vd: an Abbe number.

(c) Expressions such as "concave", "convex" and "meniscus" used to describe lens elements indicate the lens shapes near an optical axis (near the center of a lens element).

(d) A refractive power (an optical power, an inverse of a focal length) of each of the lens elements composing a cemented lens is a power in the case where there is air at the opposite sides of lens surfaces of each lens element.

(e) Since a resin material used for a hybrid aspherical lens has only an additional function of a glass material for a substrate, the hybrid aspherical lens is not handled as a single optical member, but handled similar to the case where the substrate composed of the glass material has an aspherical surface, and is considered to be one lens element. A lens refractive index is also considered to be a refractive index of a glass material forming a substrate. A hybrid aspherical lens is a lens having an aspherical surface by applying a thin layer of a resin material on a glass material forming a substrate.

<Description on Basic Idea of Inventive Imaging Optical System>

Figure 2:
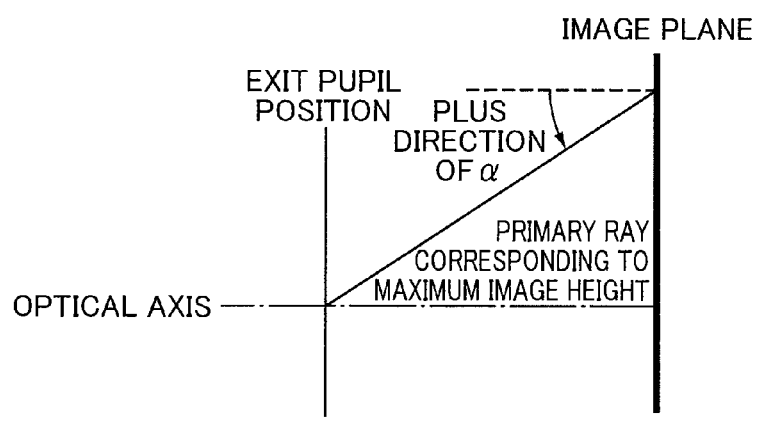
FIG. 2 is a schematic diagram showing the definition of an incident angle of a principal ray on an image plane.

FIG. 1 is a lens sectional view for schematically describing the basic idea of an imaging optical system embodying the invention. FIG. 2 is a schematic diagram showing the definition of an incident angle of a principal ray on an image plane. In the following, as shown in FIG. 2, the incident angle of the principal ray on the image plane is the angle α (unit: degree) of the principal ray incident at a maximum angle of view, out of incident light rays onto an image plane, with respect to normal to the image plane; and the incident angle c with respect to the image plane is defined based on the premise that the principal ray angle is in the plus direction in the case where the exit pupil position is located on the object side with respect to the image plane.

Referring to FIG. 1, the imaging optical system 1 for describing the above basic idea is configured to form an optical image of an object (subject) on a light receiving surface of an imaging element 17 for converting the optical image into an electrical signal, and is an optical system constituted of four lens elements i.e. a first lens element 11, a second lens element 12, a third lens element 13, and a fourth lens element 14 in the order from the object side toward the image side. The imaging element 17 is disposed at such a position that the light receiving surface thereof substantially coincides with the image plane of the imaging optical system 1. In other words, the image plane of the imaging optical system 1 corresponds to the imaging surface of the imaging element 17. To simplify the description, the imaging optical system 1 exemplarily illustrated in FIG. 1 has the same construction as an imaging optical system 1A (see FIG. 5) as Example 1 to be described later.

In the imaging optical system 1, all the first through fourth lens elements 11 through 14 are integrally movable in the optical axis direction for focusing.

Further, the first lens element 11 has a positive refractive power as a whole. The second lens element 12 has a negative refractive power as a whole, and a surface position at a maximum effective diameter of the second lens element 12 is located on the object side than a surface vertex thereof. The third lens element 13 has a positive refractive power as a whole. The fourth lens element 14 has a negative refractive power as a whole, and has an aspherical surface in a contour of a cross section taken along and through an optical axis, wherein the aspherical surface has an inflection point in a direction from the optical axis to an end of an effective area. More specifically, in the example shown in FIG. 1, the first lens element 11 is a biconvex positive lens element having both surfaces of a convex shape, the second lens element 12 is a biconcave negative meniscus lens element having both surfaces of a concave shape, the third lens element 13 is a positive meniscus lens element concave toward the object side, and the fourth lens element 14 is a biconcave negative lens element having both surfaces of a concave shape. Both surfaces of each of the first through fourth lens elements 11 through 14 are aspherical.

The first through fourth lens elements 11 through 14 may be glass molded lens elements. In the embodiment, however, the first through fourth lens elements 11 through 14 are lens elements made of a resin material such as plastic.

Further, assuming that f1 is a focal length of the first lens element 11, f is a focal length of the entire optical system, RS1 is a curvature radius of the object-side surface of the first lens element 11, RS2 is a curvature radius of the image-side surface of the first lens element 11, RS3 is a curvature radius of the object-side surface of the second lens element 12, RS4 is a curvature radius of the image-side surface of the second lens element 12, d2 is an optical axis distance between the first lens element 11 and the second lens element 12, TL is a total length of the entire optical system (in the case where a parallel plate is disposed, the length of the parallel plate is calculated, assuming that the parallel plate is air), W is a maximum half angle of view, ν4 is an Abbe number of the fourth lens element 14, and Y is a maximum image height, the imaging optical system 1 satisfies the following conditional expressions (1) through (7)

$$0.7 < f1/f < 5 \tag{1}$$

$$-0.8 < (RS1+RS2)/(RS1-RS2)/(RS-RS2) < 3 \tag{2}$$

$$-3 < (RS3+RS4)/(RS3-RS4) < 2 \tag{3}$$

$$0.03 < d2/TL < 0.2 \tag{4}$$

$$2W > 72 \tag{5}$$

$$\nu 4 > 50 \tag{6}$$

$$0.55 < Y/TL < 0.8 \tag{7}$$

The imaging optical system 1 is further provided with an optical diaphragm 15 such as an aperture stop on the object side of the first lens element 11. The optical diaphragm 15 is preferably an aperture stop. In the thus-configured imaging optical system 1, disposing an aperture stop at a position closest to the object side is advantageous in correcting astigmatism and coma aberration.

Further, the imaging element 17 is disposed on the image side of the imaging optical system 1, specifically, on the image side of the fourth lens element 14. The imaging element 17 is an element for photoelectrically converting an optical image of an object formed by the imaging optical system 1 into image signals of respective color components of R (red), G (green) and B (blue) in accordance with the light amount of the optical image, and for outputting the image signals to a specified image processing circuit (not shown). Thus, the optical image of the object on the object side is introduced to the light receiving surface of the imaging element 17 at a suitable magnification ratio along the optical axis AX by the imaging optical system 1, whereby the optical image of the object is imaged by the imaging element 17. As shown by the broken line in FIG. 1, a filter 16 may be disposed between the fourth lens element 14 and the imaging element 17. Specifically, an optical image of an object may be allowed to enter the imaging element 17 through the filter 16. The filter 16 is an optical element in the form of a parallel plate, and is a schematic example of various optical filters, or a cover glass (seal glass) for the imaging element 17. It is possible to dispose various optical filters such as an optical low-pass filter or an infrared cut filter, as necessary, depending on the purpose of use or the configuration of an imaging element or a camera.

The imaging optical system 1 has a four lens construction with positive, negative, positive, and negative refractive powers to thereby correct various aberrations such as spherical aberration and chromatic aberration, and to secure telecentricity.

In particular, the conditional expression (5) is an expression that defines the angle of view. Configuring the second lens element 12 into a predetermined shape in a wide angle lens system satisfying the conditional expression (5) is advantageous in suppressing the angle of light rays incident to the lens surface, and in correcting spherical aberration and coma aberration. In view of the above, the conditional expression (5) may preferably be the following conditional expression (5A).

$$2W > 75 \tag{5A}$$

Further, the conditional expression (1) is an expression that appropriately sets the focal length f1 of the first lens element 11 for advantageously shortening the total length of the imaging optical system 1 and correcting aberrations of the imaging optical system 1. Exceeding the upper limit of the conditional expression (1) makes it difficult to shorten the total length TL of the entire optical system, which is not preferable. On the other hand, falling below the lower limit of the conditional expression (1) excessively increases the positive optical power, and makes it difficult to correct spherical aberration or on-axis chromatic aberration, which is not preferable. In view of the above, the conditional expression (1) may preferably be a conditional expression (1A).

$$0.72 < f1/f < 2 \tag{1A}$$

Further, the conditional expression (2) is a conditional expression that defines a relationship between the curvature radii of the object-side surface and the image-side surface of the first lens element 11 for shortening the total length of the imaging optical system 1 and for appropriately correcting aberrations of the imaging optical system 1. The conditional expression (3) is a conditional expression that defines a relationship between the curvature radii of the object-side surface and the image-side surface of the second lens element 12 for shortening the total length of the imaging optical system 1 and for appropriately correcting aberrations of the imaging optical system 1. Exceeding the upper limit or falling below the lower limit of each of the conditional expression (2) and the conditional expression (3) results in an increase of the angle of light rays incident to the lens surface in a wide angle lens system. This makes it difficult to correct spherical aberration and coma aberration, which is not preferable. In view of the above, the conditional expression (2) may preferably be the following conditional expression (2A). Further, in view of the above, the conditional expression (3) may preferably be the following conditional expression (3A), and more preferably be the following conditional expression (3B).

$$-0.6 < (RS1+RS2)/(RS1-RS2) < 1 \tag{2A}$$

$$-2.7 < (RS3+RS4)/(RS3-RS4) < 1 \tag{3A}$$

$$-2.5 < (RS3+RS4)/(RS3-RS4) < 0.96 \tag{3B}$$

Further, the conditional expression (4) is an expression that appropriately sets the distance d2 between the first lens element 11 and the second lens element 12 for advantageously shortening the total length of the imaging optical system 1 and correcting aberrations of the imaging optical system 1. Exceeding the upper limit of the conditional expression (4) increases the total length TL of the entire optical system and increases the lens diameter. This makes it difficult to correct on-axis chromatic aberration, and lowers the contrast in the vicinity of the center of the image plane, which is not preferable. In view of the above, the conditional expression (4) may preferably be the following conditional expression (4A).

$$0.05 < d2/TL < 0.15 \tag{4A}$$

Further, the conditional expression (6) is a conditional expression that appropriately sets the dispersion characteristic of the fourth lens element 14 for appropriately correcting chromatic aberration. Falling below the lower limit of the conditional expression (6) makes it difficult to correct chromatic aberration of magnification, which is not preferable.

Further, the conditional expression (7) is an expression for shortening the total length of the optical system with respect to the image height. Exceeding the upper limit of the conditional expression (7) makes it difficult to correct spherical aberration, which is not preferable. On the other hand, falling below the lower limit of the conditional expression (7) increases the total length of the entire optical system, and makes it difficult to correct distortion, which is not preferable. In view of the above, the conditional expression (7) may preferably be the following conditional expression (7A).

$$0.58<Y/TL<0.8 \quad (7A)$$

As described above, the imaging optical system 1 having the above configuration is capable of advantageously correcting various aberrations, while achieving miniaturization.

In the specification, miniaturization means that the imaging optical system satisfies the condition: L/2Y<1, preferably, L/2Y<0.9, and more preferably, L/2Y/0.85, where L denotes an optical axis distance from the lens surface of the lens element closest to the object side in the imaging optical system to the image-side focal point, and 2Y denotes a diagonal length of the imaging surface (e.g. a diagonal length of a rectangular effective pixel area in a solid-state imaging element). The image-side focal point indicates an image point to be obtained in the case where a light ray in parallel to the optical axis is incident to the imaging optical system. Further, in the case where a parallel plate member such as an optical low-pass filter, an infrared cut filter, or a seal glass of a solid-state imaging element package is disposed between the lens surface closest to the image side in the imaging optical system, and the image-side focal point, the aforementioned expression is calculated, assuming that the parallel plate member is air.

As described above, in the imaging optical system 1, all the first through fourth lens elements 11 through 14 are resin lens elements made of a resin material. In recent years, miniaturization of the overall size of a solid-state imaging device has been required. As a result of the miniaturization, the pixel pitch is reduced, even with use of a solid-state imaging element having the same pixel number as used in the conventional imaging device. Consequently, the size of the imaging surface is reduced. It is necessary to relatively shorten the focal length of the entire optical system for use in a solid-state imaging element having such a small imaging surface. This results in a considerable reduction of the curvature radius or the outer diameter of each lens element. In the imaging optical system 1, all the lens elements are resin lens elements manufactured by injection molding. Accordingly, it is possible to mass-produce the imaging optical system 1 at a low cost, regardless of use of the lens elements having a small curvature radius or outer diameter, unlike an optical system incorporated with glass lens elements to be manufactured by a cumbersome polishing process. Further, a resin lens element is advantageous in a point that the pressing temperature can be lowered. Accordingly, it is possible to suppress wear of a molding die. As a result, the number of times of replacing the molding die or the number of times of maintenance can be reduced, which is advantageous in suppressing the cost. Further, a resin lens element is particularly advantageous in the aspect of reducing the weight in the case where the resin lens element is loaded in a mobile terminal device.

Further, the imaging optical system 1 satisfies the following conditional expression (8), in the case where the third lens element 13 has a biconvex shape, and d3 is the focal length of the third lens element 13.

$$0.3<f3/f<3 \quad (8)$$

The conditional expression (8) is an expression that appropriately sets the focal length f3 of the third lens element 13 for advantageously securing a wide angle of view, and shortening the total length of the imaging optical system 1. By configuring the third lens element 13 to have a biconvex shape and allowing the focal length f3 to fall in the range defined in the conditional expression (8), the third lens element 13 is operable to share the positive optical power with the first lens element 11. This is advantageous in securing a wide angle of view, while shortening the total length of the entire optical system. In view of the above, the conditional expression (8) may preferably be the following conditional expression (8A).

$$0.35<f3/f<1.5 \quad (8A)$$

Further, in the imaging optical system 1, the fourth lens element 14 is a meniscus lens element having an object-side surface of a convex shape. Forming the object-side surface of the fourth lens element 14 into a convex meniscus shape is advantageous in easily correcting distortion and controlling the exit pupil position in shortening the total length of the imaging optical system 1.

Further, the imaging optical system 1 satisfies the following conditional expression (9), where d4 is an optical axis distance between the second lens element 12 and the third lens element 13.

$$d4/f<0.1 \quad (9)$$

The conditional expression (9) is an expression for shortening the total length of the entire optical system and for correcting aberrations. Exceeding the upper limit of the conditional expression (9) in the imaging optical system 1 makes it difficult to correct chromatic aberration of magnification of the third lens element 13, which is not preferable.

Further, the imaging optical system 1 satisfies the following conditional expressions (10) through (12), where ν1 is the Abbe number of the first lens element 11, ν2 is the Abbe number of the second lens element 12, and ν3 is the Abbe number of the third lens element 13.

$$\nu1>50 \quad (10)$$

$$\nu2<30 \quad (11)$$

$$\nu3>50 \quad (12)$$

The conditional expressions (10) through (12) are conditional expressions that appropriately set the respective dispersion characteristics of the first through third lens elements 11 through 13 for appropriately correcting chromatic aberration. Setting the Abbe numbers ν1, ν2, and ν3 of the first lens element 11, the second lens element 12, and the third lens element 13 respectively in the ranges defined in the conditional expressions (10), (11), and (12) is advantageous in effectively suppressing on-axis chromatic aberration and chromatic aberration of magnification of the imaging optical system 1. In view of the above, the conditional expression (11) may preferably be the following conditional expression (11A)

$$\nu2<25 \quad (11A)$$

Further, assuming that ET7 is the thickness of an effective diameter portion of the object-side surface of the third lens element 13 in the optical axis direction, CT7 is an optical axis thickness of the third lens element 13, RS5 is a curvature radius of the object-side surface of the third lens element 13, and RS6 is a curvature radius of the image-side surface of the third lens element 13, the imaging optical system 1 satisfies the following conditional expressions (13 and (14).

$$0.1 < ET7/CT7/0.8 \quad (13)$$

$$0.1 < (RS5+RS6)/(RS5-RS6) < 5 \quad (14)$$

The conditional expression (13) is an expression for shortening the total length of the imaging optical system 1 and for correcting aberrations of the imaging optical system 1. The conditional expression (14) is a conditional expression that defines a relationship between the curvature radii of the object-side surface and the image-side surface of the third lens element 13 for shortening the total length of the imaging optical system 1 and for appropriately correcting aberrations of the imaging optical system 1. Exceeding the upper limit of the conditional expression (13) in the imaging optical system 1 results in insufficient correction of coma aberration and distortion, which is not preferable. On the other hand, falling below the lower limit of the conditional expression (13) results in deterioration of the external appearance in molding, which is not preferable. Further, exceeding the upper limit or falling below the lower limit of the conditional expression (14) makes it difficult to correct distortion and to control the exit pupil position in a wide angle lens system, which is not preferable. In view of the above, the conditional expression (13) may preferably be the following conditional expression (13A). Further, in view of the above, the conditional expression (14) may preferably be the following conditional expression (14A).

$$0.25 < ET7/CT7/0.6 \quad (13A)$$

$$0.3 < (RS5+RS6)/(RS5-RS6) < 4 \quad (14A)$$

Further, the imaging optical system 1 satisfies the following conditional expression (15).

$$0.2 < |RS3/RS4| < 4 \quad (15)$$

The conditional expression (15) is an expression for shortening the total length of the entire optical system and for correcting aberrations. Exceeding the upper limit of the conditional expression (15) in the imaging optical system 1 makes it difficult to shorten the total length of the entire optical system, which is not preferable. On the other hand, falling below the lower limit of the conditional expression (15) increases the angle of light rays incident to the lens surface, and makes it difficult to correct spherical aberration and coma aberration in a wide angle lens system, which is not preferable. In view of the above, the conditional expression (15) may preferably be the following conditional expression (15A).

$$0.3 < |RS3/RS4| < 3 \quad (15A)$$

Further, the imaging optical system 1 has the aperture stop 15 on the object side than the object-side surface of the first lens element 11. Disposing the aperture stop 15 at a position closest to the object side is advantageous in correcting astigmatism and coma aberration of the imaging optical system 1.

Further, the aforementioned imaging optical system 1 may be provided with an aperture stop between the first lens element 11 and the second lens element 12, in place of the optical diaphragm 15 disposed on the object side of the first lens element 11. The imaging optical system 1 having the above configuration allows a light flux passing through the lens element 12 having a negative refractive power to pass at a position close to the optical axis to thereby strengthen the negative refractive power of the second lens element 12. This is advantageous in reducing the field curvature.

Further, in the imaging optical system 1, a cam, a stepping motor or a piezoelectric actuator may be used for driving the first through fourth lens elements 11 through 14, as movable lens elements. Use of a piezoelectric actuator is advantageous in further miniaturizing the imaging device, while suppressing an increase in the volume of a drive device and suppressing an increase in the electric power consumption.

Further, as described above, a resin lens element is used in the imaging optical system 1. Alternatively, in the imaging optical system 1, a glass lens element having an aspherical surface may be used. In the modification, the aspherical glass lens element may be a glass molded aspherical lens element, a ground aspherical glass lens element, or a hybrid aspherical lens element (a lens element obtained by forming an aspherical resin layer on a spherical glass lens element). The glass molded aspherical lens element is preferable for mass production. The hybrid aspherical lens element has a high degree of freedom in design, because many kinds of glass materials capable of molding into a substrate are available. In particular, it is preferable to use a hybrid aspherical lens element, in view of a point that it is not easy to mold a material having a high refractive index into an aspherical lens element. Further, forming one surface of a lens element into an aspherical surface is advantageous in maximally utilizing the advantages of the hybrid aspherical lens element.

Further, in the case where a resin lens element is used in the imaging optical system 1, it is preferable to use a lens element molded by using a material, in which particles of 30 nm or smaller as a maximum diameter are dispersed in plastic (resin material).

Generally, if fine particles are mixed with a transparent resin material, light is scattered, which lowers the transmittance. Thus, it has been difficult to use such a material as an optical material. However, by setting the size of the fine particles to a value smaller than the wavelength of a transmitted light flux, light is not substantially scattered. As temperature rises, the refractive index of the resin material is lowered. Conversely, as temperature rises, the refractive index of inorganic particles is raised. Accordingly, it is possible to generally keep the refractive index unchanged with respect to a temperature change by cancelling out the refractive indexes, taking advantage of such temperature dependencies. More specifically, it is possible to obtain a resin material having a refractive index with less temperature dependence by dispersing inorganic particles having a maximum diameter of 30 nm or smaller in the resin material as a base material. For example, fine particles of niobium oxide ($Nb_2O_5$) are dispersed in acrylic resin. In the imaging optical system 1 thus constructed, variation of the image point position at the time of temperature change in the entirety of the imaging optical system 1 can be suppressed by using a resin material containing inorganic fine particle dispersants for a lens element having a relatively large refractive power or for all the lens elements.

It is preferable to mold such a resin lens element containing inorganic fine particles as a dispersant as follows.

A refractive index change with temperature is described as follows. A refractive index change n(T) with temperature is expressed by the following formula (Fa) by differentiating a refractive index n by temperature T based on the Lorentz-Lorentz formula.

$$n(T) = ((n^2+2) \times (n^2-1))/6n \times (-3\alpha + (1/[R]) \times (\partial[R]/\partial T)) \quad (Fa)$$

where $\alpha$ denotes a linear expansion coefficient and [R] denotes a molecular refraction.

In the case of a resin material, contribution of the refractive index to the temperature dependence is generally smaller in the second term than in the first term of the formula Fa, and can be substantially ignored. For instance, in the case of a PMMA resin, the linear expansion coefficient $\alpha$ is $7 \times 10^{-5}$, and, if the linear expansion coefficient α is substituted into the formula (Fa), n(T)=−12×10$^{-5}$ (/° C.), which substantially coincides with an actual measurement value.

Specifically, the refractive index change n(T) with temperature, which has conventionally been about −12×10$^{-5}$ (/° C.), is preferably suppressed to below 8×10$^{-5}$ (/° C.) in absolute value, and more preferably suppressed to below 6×10$^{-5}$ (/° C.) in absolute value.

In view of the above, it is preferable to use a resin material containing polyolefin, a resin material containing polycarbonate, or a resin material containing polyester, as such a resin material. The refractive index change n(T) with temperature is about −11×10$^{-5}$ (/° C.) in the resin material containing polyolefin, about −14×10$^{-5}$ (/° C.) in the resin material containing polycarbonate, and about −13×10$^{-5}$ (/° C.) in the resin material containing polyester.

In recent years, as a method for mass-producing an imaging device at a low cost, there has been proposed a technique, in which a substrate potted with solder is subjected to reflow processing (heating treatment) in a state that electronic components including an IC chip, and optical elements are mounted for melting the solder, whereby the electronic components and the optical element are simultaneously attached to the substrate.

It is necessary to heat the optical elements together with the electronic components in a temperature range of from about 200 to 260° C. for mounting these elements using the reflow processing. In such a high temperature range, however, a lens element using a thermoplastic resin may be thermally deformed or may be discolored, which may degrade the optical performance.

In view of the above, it is preferable to use an energy curable resin, as a lens material. This is because the energy curable resin has a property that degradation of the optical performance when exposed to a high temperature condition is small, as compared with a lens element using a thermoplastic resin such as polycarbonate resin or polyolefin resin; and accordingly, use of the energy curable resin is effective in reflow processing. Further, a lens element made of an energy curable resin is easily producible as compared with a glass molded lens element, and accordingly, is inexpensive. Thus, use of the energy curable resin is advantageous in satisfying both of the requirements i.e. lowering the cost and achieving mass production of an imaging device incorporated with the imaging optical system 1. In the embodiment, examples of the energy curable resin include thermo curable resins and ultraviolet curable resins.

An example of the energy curable resin is a resin obtained by adding 1 wt % of perbutyl O (produced by Nippon Yushi Co., Ltd.) as a polymerization initiator in NK ester DCP (tricyclodecane dimethanol dimethacrylate, produced by Shin-Nakamura Chemical Co., Ltd.), followed by curing at 150° C. for ten minutes.

<Description on Digital Apparatus Incorporated with Imaging Optical System>

In this section, a digital apparatus incorporated with the aforementioned imaging optical system 1 is described.

Figure 3:
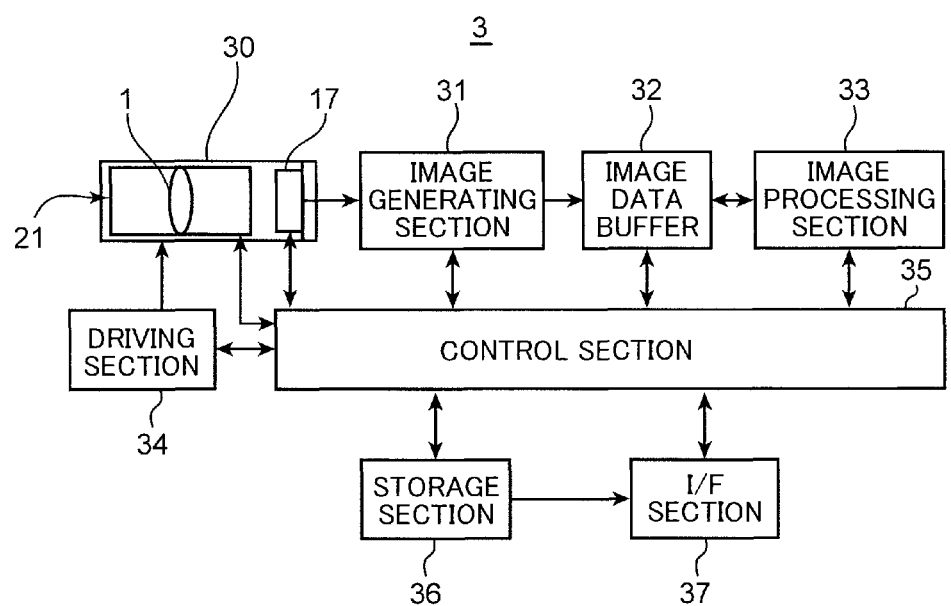
FIG. 3 is a block diagram showing a configuration of a digital apparatus incorporated with the imaging optical system.

FIG. 3 is a block diagram showing a configuration of a digital apparatus incorporated with the imaging optical system 1. A digital apparatus 3 is provided with, as imaging functions, an imaging section 30, an image generating section 31, an image data buffer 32, an image processing section 33, a driving section 34, a control section 35, a storage section 36, and an I/F section 37. Examples of the digital apparatus 3 are a digital still camera, a video camera, a monitor camera, a mobile terminal device such as a mobile phone and a personal digital assistant (PDA), a personal computer, and a mobile computer. Peripheral devices (e.g. a mouse, a scanner, and a printer) of these devices may be included as examples of the digital apparatus 3. In particular, the imaging optical system 1 is sufficiently miniaturized to be loaded in a mobile terminal device such as a mobile phone or a personal digital assistant (PDA), and is suitably loaded in the mobile terminal device.

The imaging section 30 is constituted of an imaging device 21 and the imaging element 17. The imaging device 21 is provided with the imaging optical system 1 as shown in FIG. 1 and functioning as an imaging lens, and an unillustrated lens driving device which drives the lens elements for focusing in the optical axis direction so as to perform a focusing operation. Light rays from an object are formed on the light receiving surface of the imaging element 17 by the imaging optical system 1, whereby an optical image of the object is obtained.

The imaging element 17 converts an optical image of an object formed by the imaging optical system 1 into electrical signals (image signals) of respective color components of R, G and B, and outputs these electrical signals to the image generating section 31 as image signals of the respective colors of R, G and B. The imaging element 17 is controlled by the control section 35 to perform an imaging operation e.g. at least one of a still image imaging operation and a moving image imaging operation, or a readout operation of output signals from the respective pixels in the imaging element 17 (including horizontal synchronization, vertical synchronization, transfer). The imaging element 17 may be a so-called back surface illumination type solid-state imaging element. The back surface illumination type solid-state imaging element has a light receiving portion (e.g. a portion in which photoelectric conversion is performed, such as a p-n junction portion), which is disposed on the imaging lens side than a wiring layer. The back surface illumination type solid-state imaging element is significantly advantageous in enhancing the sensitivity in a low luminance range and in suppressing a light amount reduction in peripheral portions due to oblique incidence, because the substantial amount of light that impinges the light receiving portion is increased, as compared with a conventional solid-state imaging element.

The image generating section 31 performs an amplification processing, a digital conversion processing and the like with respect to analog output signals from the imaging element 17, performs known image processings such as determination of a proper black level, gamma-correction, white balance adjustment (WB adjustment), outline correction and color unevenness correction for the entire image, and generates image data from the image signals. The image data generated by the image generating section 31 is outputted to the image data buffer 32.

The image data buffer 32 is a memory which temporarily stores image data, and is used as a work area in which the image processing section 33 performs a processing to be described later with respect to the image data. An example of the image data buffer 32 is an RAM (Random Access Memory), which is a volatile storage element.

The image processing section 33 is a circuit for performing a predetermined image processing such as resolution conversion with respect to image data from the image data buffer 32.

Further, the image processing section 33 may be so configured as to correct aberrations, which could not be corrected by the imaging optical system 1, by performing a known distortion correction processing for correcting a distortion in an optical image of an object formed on the light receiving surface of the imaging element 17, as necessary. A distortion correction is correcting an image distorted by aberrations into a natural image substantially free from distortion and having a similar shape as a scene seen by the naked eye. By such a configuration, even if an optical image of an object introduced to the imaging element 17 by the imaging optical system 1 is distorted, a natural image substantially free from distortion can be generated. Further, in a configuration for correcting a distortion by an image processing by means of an information processing, only the aberrations other than the distortion have to be considered, wherefore a degree of freedom in the design of the imaging optical system 1 is increased, and an easier design becomes possible. Further, in a configuration for correcting such a distortion by an image processing by means of an information processing, in particular, aberration of a lens element closer to the image side is reduced. This makes it easy to control the exit pupil position, and to form a lens element into an intended shape.

Further, the image processing section 33 may also perform a known peripheral illuminance reduction correction processing for correcting a reduction in peripheral illuminance in an optical image of an object formed on the light receiving surface of the imaging element 17. The peripheral illuminance reduction correction (shading correction) is performed by storing correction data for the peripheral illuminance reduction correction beforehand, and multiplying a photographed image (pixels) with the correction data. Since the reduction in peripheral illuminance mainly occurs due to incident angle dependence of sensitivity of the imaging element 17, lens vignetting, cosine fourth law and the like, the correction data is set at such a specified value as to correct an illuminance reduction caused by these factors. By employing such a configuration, it is possible to generate an image having a sufficient illuminance up to the periphery, even if peripheral illuminance is reduced in an optical image of an object introduced to the imaging element 17 by the imaging optical system 1.

In this embodiment, the shading correction may be performed by slightly reducing the pitch of the arrangement of a color filter or an on-chip micro-lens array with respect to the pixel pitch on the imaging surface of the imaging element 17 in such a manner as to reduce the shading. In such a configuration, the color filter or the on-chip micro-lens array is shifted toward the optical axis side of the imaging optical system 1 with respect to each pixel, as the imaging surface of the imaging element 17 comes close to the periphery of the imaging surface by slightly reducing the pitch as described above. Accordingly, it is possible to efficiently guide a light flux incident in an oblique direction to a light receiving portion of each pixel. This is advantageous in suppressing the shading occurred in the imaging element 17.

The driving section 34 drives the lens elements for focusing in the imaging optical system 1 so as to perform focusing as required by causing the unillustrated lens driving device to actuate based on a control signal to be outputted from the control section 35.

The control section 35 is provided with a microprocessor and peripheral circuits thereof, and controls the operations of the respective parts i.e. the imaging section 30, the image generating section 31, the image data buffer 32, the image processing section 33, the driving section 34, the storage section 36, and the I/F section 37 in accordance with the respective functions thereof. In other words, the control section 35 controls the imaging device 21 to execute at least one of a still image photographing and a moving image photographing of an object.

The storage section 36 is a storage circuit for storing image data generated by a still image photographing or a moving image photographing of an object. For instance, the storage section 36 is constituted of an ROM (Read Only Memory), which is a non-volatile storage element, an EEPROM (Electrically Erasable Programmable Read Only memory), which is a rewritable non-volatile storage element, and an RAM. In other words, the storage section 36 has a function as a still image memory and a moving image memory.

The I/F section 37 is an interface through which image data is transmitted and received to and from an external device. Examples of the I/F section 37 are interfaces in accordance with the standards such as USB or IEEE1394.

In the following, an imaging operation to be performed by the digital apparatus 3 having the above configuration is described.

In the case where a still image is photographed, the control section 35 controls the imaging device 21 to perform the still image photographing, and controls the driving section 34 to actuate the unillustrated lens driving device of the imaging device 21 for moving all the lens elements, whereby focusing is performed. By the control, a focused optical image is repeatedly and cyclically formed on the light receiving surface of the imaging element 17, and is converted into image signals of the respective color components of R, G and B. Thereafter, the image signals are outputted to the image generating section 31. The image signals are temporarily stored in the image data buffer 32, and are subjected to an image processing by the image processing section 33. Thereafter, an image based on the processed image signals is displayed on a display (not shown). Then, the photographer is allowed to adjust the position of the main object so that the main object is located at an intended position within a screen while viewing the display. When a shutter button (not shown) is depressed in this state, image data is stored in the storage element 36 as a still image memory. Thus, a still image is obtained.

In the case where a moving image photographing is performed, the control section 35 controls the imaging device 21 to perform the moving image photographing. Then, the photographer is allowed to adjust the position of the image of the object obtained by the imaging device 21 so that the image of the object is located at an intended position within a screen while viewing the display (not shown) substantially in the same manner as the still image photographing. When the photographer depresses the shutter button (not shown) in this state, the moving image photographing is started. At the time of the moving image photographing, the control section 35 controls the imaging device 21 to perform the moving image photographing, and controls the driving section 34 to actuate the unillustrated lens driving device of the imaging device 21, whereby focusing is performed. By the control, a focused optical image is repeatedly and cyclically formed on the light receiving surface of the imaging element 17, and is converted into image signals of the respective color components of R, G and B. Thereafter, the converted image signals are outputted to the image generating section 31. The image signals are temporarily stored in the image data buffer 32, and are subjected to an image processing by the image processing section 33. Thereafter, an image based on the processed image signals is displayed on the display (not shown). When the photographer depresses the shutter button (not shown) again, the moving image photographing is ended. The photographed moving image is stored in the storage element 36 as a moving image memory.

In the aforementioned configuration, it is possible to provide the imaging device 21 and the digital apparatus 3 incorporated with the imaging optical system 1 having a four lens construction, in which various aberrations are advantageously corrected, while achieving miniaturization. In particular, miniaturization, and enhanced aberration correction are achieved in the imaging optical system 1. Accordingly, it is possible to employ a high-pixel imaging element 17, while achieving miniaturization. In particular, since the imaging optical system 1 is compact and is applicable to a high-pixel imaging element, the imaging optical system 1 is advantageously used in a mobile terminal device having a high pixel density and enhanced functions. The following is an example of a configuration, in which the imaging device 21 is loaded in a mobile phone.

Figure 4A:
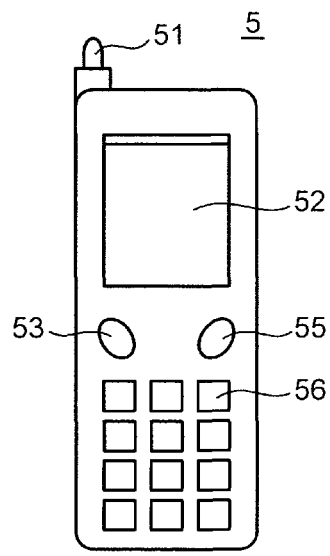
FIGS. 4A, 4B are front and rear external configuration diagram of a camera-mounted mobile phone as an example of the digital apparatus.
Figure 4B:
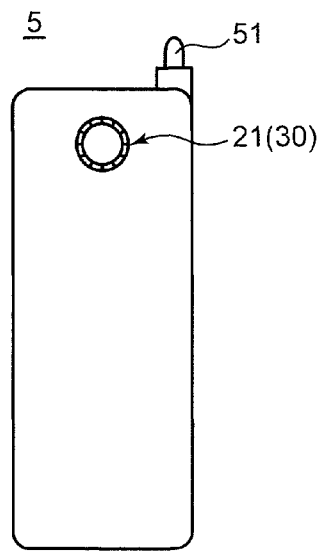

FIGS. 4A and 4B are external configuration diagrams of a camera-mounted mobile phone, as an example of the digital apparatus 3. FIG. 4A shows an operation surface of the mobile phone, and FIG. 4B shows a back surface opposite to the operation surface, namely, a back surface of the mobile phone.

Referring to FIGS. 4A and 4B, a mobile phone 5 is provided with an antenna 51 at an upper portion thereof. As shown in FIG. 4A, there are mounted, on the operation surface of the mobile phone 5, a rectangular display 52, an image photographing button 53 for allowing the user to activate the image photographing mode and to switch the image photographing mode between the still image photographing and the moving image photographing, a shutter button 55, and a dial button 56.

Further, the mobile phone 5 is built in with a circuit for implementing a telephone function using a mobile telephone network. The mobile phone 5 is further built in with the imaging section 30, the image generating section 31, the image data buffer 32, the image processing section 33, the driving section 34, the control section 35, and the storage section 36. The imaging device 21 of the imaging section 30 is exposed to the outside through the back surface of the mobile phone 5.

In response to user's operation of the image photographing button 53, a control signal representing the operation contents instructed by the user is outputted to the control section 35. Then, the control section 35 executes operations in accordance with the operation contents, such as activation and execution of the still image photographing mode, or activation and execution of the moving image photographing mode. Then, in response to user's operation of the shutter button 55, a control signal representing the operation contents is outputted to the control section 35. Then, the control section 35 executes operations in accordance with the operation contents such as still image photographing or moving image photographing.

<Description on Practical Examples of Imaging Optical System>

In the following, practical constructions of the imaging optical system 1 as shown in FIG. 1 i.e. of the imaging optical system 1 incorporated in the imaging device 21 to be loaded in the digital apparatus 3 as shown in FIG. 3 are described with reference to the drawings.

EXAMPLES

FIGS. 5 through 13 are sectional views showing arrangements of lens elements in imaging optical systems as Examples 1 through 9. FIGS. 14A through 22C are longitudinal aberration diagrams of the imaging optical systems as Examples 1 through 9.

As shown in FIGS. 5 through 13, each of the imaging optical systems 1A through 1I as Examples 1 through 9 is generally provided with a first lens element L1 having a positive refractive power, a second lens element L2 having a negative refractive power, a third lens element L3 having a positive refractive power, and a fourth lens element L4 having a negative refractive power. The first through fourth lens elements L1 through L4 are disposed in this order from the object side toward the image side. In performing a focusing operation, all the first through fourth lens elements L1 through L4 are integrally moved in the optical axis direction AX. Regarding the imaging optical systems 1A through 1I as Examples 1 through 9, the imaging optical systems 1A through 1G and 1I as Examples 1 through 7 and 9, and the imaging optical system 1H as Example 8 substantially differ from each other in terms of the arrangement position of the optical diaphragm ST. Specifically, whereas in the imaging optical systems 1A through 1G and 1I as Examples 1 through 7 and 9, the optical diaphragm ST is disposed on the object side of the first lens element L1 (at a position closest to the object side in the imaging optical systems 1A through 1G and 1I), in the imaging optical system 1H as Example 8, the optical diaphragm ST is disposed on the image side of the first lens element L1 (between the first lens element L1 and the second lens element L2).

More specifically, in each of the imaging optical systems 1A through 1I as Examples 1 through 9, the first through fourth lens elements L1 through L4, which are arranged in this order from the object side toward the image side, are configured as follows.

Firstly, referring to the imaging optical system 1A as Example 1, the first lens element L1 is a biconvex positive lens element having a positive refractive power, the second lens element L2 is a biconcave negative lens element having a negative refractive power, the third lens element L3 is a positive meniscus lens element concave toward the object side and having a positive refractive power, and the fourth lens element L4 is a biconcave negative lens element having a negative refractive power.

Further, the imaging optical system 1B as Example 2 is different from the imaging optical system 1A as Example 1 in terms of the lens configuration of the third lens element L3. Specifically, referring to the imaging optical system 1B as Example 2, the first lens element L1 is a biconvex positive lens element, the second lens element L2 is a biconcave negative lens element, the third lens element L3 is a biconvex positive lens element having a positive refractive power, and the fourth lens element is a biconcave negative lens element.

Further, the imaging optical systems 1C and 1D as Examples 3 and 4 are different from the imaging optical system 1A as Example 1 in terms of the lens configuration of each of the second and fourth lens elements L2 and L4. Specifically, referring to the imaging optical systems 1C and 1D as Examples 3 and 4, the first lens element L1 is a biconvex positive lens element, the second lens element L2 is a negative meniscus lens element convex toward the image side and having a negative refractive power, the third lens element L3 is a positive meniscus lens element concave toward the object side and having a positive refractive power, and the fourth lens element L4 is a negative meniscus lens element convex toward the object side and having a negative refractive power.

Further, the imaging optical systems 1E and 1I as Examples 5 and 9 are different from the imaging optical system 1C as Example 3 in terms of the lens configuration of the third lens element L3. Specifically, referring to the imaging optical systems 1E and 1I as Examples 5 and 9, the first lens element L1 is a biconvex positive lens element, the second lens element L2 is a negative meniscus lens element convex toward the image side and having a negative refractive power, the third lens element L3 is a biconvex positive lens element having a positive refractive power, and the fourth lens element L4 is a negative meniscus lens element convex toward the object side and having a negative refractive power.

Further, the imaging optical system 1F as Example 6 is different from the imaging optical system 1A as Example 1 in terms of the lens configuration of the third lens element L3. Specifically, referring to the imaging optical system 1F as Example 6, the first lens element L1 is a biconvex positive lens element, the second lens element L2 is a biconcave negative lens element, the third lens element L3 is a positive meniscus lens element convex toward the object side and having a positive refractive power, and the fourth lens element L4 is a biconcave negative lens element.

Further, the imaging optical system 1G as Example 7 and the imaging optical system 1H as Example 8 are substantially the same as each other in terms of the lens configuration, although the imaging optical system 1G as Example 7 and the imaging optical system 1H as Example 8 differ from each other in terms of the arrangement position of the optical diaphragm ST, as described above. Further, the imaging optical systems 1G and 1H as Examples 7 and 8 are different from the imaging optical system 1B as Example 2 in terms of the lens configuration of the fourth lens element L4. Specifically, referring to the imaging optical systems 1G and 1H as Examples 7 and 8, the first lens element L1 is a biconvex positive lens element, the second lens element L2 is a biconcave negative lens element, the third lens element L3 is a biconvex positive lens element, and the fourth lens element L4 is a negative meniscus lens element convex toward the object side and having a negative refractive power.

In the imaging optical systems 1A through 1H as Examples 1 through 9, both surfaces of each of the first through fourth lens elements L1 through L4 have an aspherical shape, an aspherical surface of the fourth lens element L4 is in the contour of a cross section taken along and through the optical axis AX, and the aspherical surface of the fourth lens element L4 has an inflection point in a direction from the optical axis AX to an end of an effective area. The first through fourth lens elements L1 through L4 are resin lens elements.

The optical diaphragm ST may be an aperture stop, a mechanical shutter, or a variable aperture stop, in each of Examples 1 through 9.

The light receiving surface of an imaging element SR is disposed on the image side of the fourth lens element L4. As shown by the broken line in each of the drawings of FIGS. 5 through 13, a parallel plate FT may be disposed between the fourth lens element L4 and the imaging element SR. Specifically, the light receiving surface of the imaging element SR is disposed on the image side of the fourth lens element L4, with the parallel plate FT being interposed between the imaging element SR and the fourth lens element L4. The parallel plate FT may be one of the optical filters or a cover glass for the imaging element SR.

In each of the drawings of FIG. 5 through 13, the symbol "ri" (i=1, 2, 3, . . . ) attached to each of the lens surfaces indicates the i-th lens surface counted from the object side. It should be noted that a surface of a cemented lens is counted as a lens surface. The surface attached with the asterisk "*" to the symbol "ri" indicates an aspherical surface. It should be noted that the surface of the optical diaphragm ST and the light receiving surface of the imaging element SR are also regarded as a surface. The aforementioned handling and definition on the symbols hold true to Examples 1 through 9. However, this does not mean that everything is the same between Examples 1 through 9. For instance, throughout the drawings showing Examples 1 through 9, the lens surface closest to the object side is attached with the same symbol "ri". However, as shown in the construction data to be described later, this does not mean that the curvatures of the lens surfaces attached with the same symbol are identical to each other throughout Examples 1 through 9.

In the imaging optical systems 1A through 1G and 1I as Examples 1 through 7 and 9 having the aforementioned configuration, light rays incident from the object side successively pass through the optical diaphragm ST, the first lens element L1, the second lens element L2, the third lens element L3, and the fourth lens element L4 along the optical axis AX, and form an optical image of an object on the light receiving surface of the imaging element SR. Further, in the imaging optical system 1H as Example 8, light rays incident from the object side successively pass through the first lens element L1, the optical diaphragm ST, the second lens element L2, the third lens element L3, and the fourth lens element L4 along the optical axis AX, and form an optical image of an object on the light receiving surface of the imaging element SR. Then, in the imaging optical systems 1A through 1I as Examples 1 through 9, the imaging element SR converts the optical image into an electrical signal. The electrical signal is applied with a specified digital image processing as necessary, and is stored as a digital image signal in a memory of a digital apparatus such as a digital camera, or transmitted to another digital apparatus by wired or wireless communication through an interface.

Construction data of the respective lens elements in the imaging optical systems 1A through 1I as Examples 1 through 9 are as follows.

Construction data of the respective lens elements in the imaging optical system 1A as Example 1 are shown below.

Numerical Data in Example 1

| Unit: mm | | | | |
|---|---|---|---|---|
| Lens Surface Data | | | | |
| lens surface | r | d | nd | vd |
| object plane | ∞ | ∞ | | |
| 1 (aperture stop) | ∞ | 0.095 | | |
| 2* | 5.278 | 0.509 | 1.54470 | 56.15 |
| 3* | −1.952 | 0.316 | | |
| 4* | −63.692 | 0.273 | 1.63469 | 23.87 |
| 5* | 1.598 | 0.067 | | |
| 6* | −5.203 | 1.077 | 1.54470 | 56.15 |
| 7* | −0.535 | 0.050 | | |
| 8* | −500.000 | 0.548 | 1.54470 | 56.15 |
| 9* | 0.710 | 1.165 | | |
| image plane | ∞ | | | |

Aspherical Surface Data

Second surface

K = −8.6827e+001, A4 = −1.8046e−001, A6 = 7.0799e−002,
A8 = −2.2270e+000, A10 = 2.4140e+000
Third surface K = 5.9001e+000, A4 = −4.0632e−001, A6 = 5.2164e−001,
A8 = −1.1387e+000, A10 = 1.2725e+000
Fourth surface K = 9.0000e+001, A4 = −1.3229e+000, A6 = 5.4288e−001,
A8 = 6.8222e−001, A10 = 3.3536e−001, A12 = −8.5897e−001
Fifth surface K = −1.8845e+001, A4 = −5.6110e−001, A6 = 4.3193e−001,
A8 = 6.2388e−002, A10 = −3.3002e−001, A12 = 1.5576e−001

-continued

Unit: mm

Sixth surface

K = −3.0030e+001, A4 = −1.1937e−001, A6 = 3.3473e−001,
A8 = −2.9242e−001, A10 = 1.5584e−001, A12 = −3.3032e−002
Seventh surface K = −2.8524e+000, A4 = −3.5391e−001, A6 = 3.6540e−001,
A8 = −2.5063e−001, A10 = 1.6480e−001, A12 = −3.6050e−002
Eight surface K = −9.0000e+001, A4 = 1.2656e−001, A6 = −1.7146e−001,
A8 = 1.3563e−001, A10 = −8.3641e−002, A12 = 3.1381e−002,
A14 = −5.1691e−003
Ninth surface K = −7.2695e+000, A4 = −4.4270e−002, A6 = 2.5821e−002,
A8 = −1.5939e−002, A10 = 6.1986e−003, A12 = −1.2811e−003,
A14 = 9.6890e−005

Various Data

| | |
|---|---|
| focal length (f) | 2.400 (mm) |
| F-number (Fno) | 2.800 |
| angle of view (w) | 46.672 (mm) |
| image height (maximum) (y max) | 2.434 (mm) |
| back focus (Bf) | 1.165 (mm) |
| total length of lens system (TL) | 4.101 (mm) |

Focal length of each lens element (mm)

| | |
|---|---|
| first lens element L1 | 2.682 |
| second lens element L2 | −2.452 |
| third lens element L3 | 1.011 |
| fourth lens element L4 | −1.301 |

Next, construction data of the respective lens elements in the imaging optical system 1B as Example 2 are shown below.

Numerical Data in Example 2

Unit: mm

Lens Surface Data

| lens surface | r | d | nd | vd |
|---|---|---|---|---|
| object plane | ∞ | ∞ | | |
| 1 (aperture stop) | ∞ | 0.074 | | |
| 2* | 3.243 | 0.447 | 1.54470 | 56.15 |
| 3* | −3.008 | 0.349 | | |
| 4* | −8.166 | 0.260 | 1.63469 | 23.87 |
| 5* | 2.164 | 0.050 | | |
| 6* | 11.341 | 1.073 | 1.54470 | 56.15 |
| 7* | −0.565 | 0.059 | | |
| 8* | −500.000 | 0.478 | 1.54470 | 56.15 |
| 9* | 0.616 | 1.118 | | |
| image plane | ∞ | | | |

Aspherical Surface Data

Second surface

K = −1.5254e+001, A4 = −1.1660e−001, A6 = −2.3615e−002,
A8 = −5.4882e−001, A10 = 4.8275e−002
Third surface K = 1.6811e+001, A4 = −1.8499e−001, A6 = 1.3835e−001,
A8 = −3.5475e−001, A10 = 7.7187e−001
Fourth surface K = 3.9892e+001, A4 = −6.2126e−001, A6 = 3.7195e−001,
A8 = −1.9689e−002, A10 = 2.9557e−001, A12 = −4.1585e−001

-continued

Unit: mm

Fifth surface

K = −3.3683e+001, A4 = −2.7001e−001, A6 = 1.9610e−001,
A8 = 3.5236e−002, A10 = −2.0855e−001, A12 = 1.0067e−001
Sixth surface K = 9.0000e+001, A4 = −1.7605e−001, A6 = 3.2712e−001,
A8 = −2.6924e−001, A10 = 1.6605e−001, A12 = −4.4667e−002
Seventh surface K = −3.1627e+000, A4 = −3.1421e−001, A6 = 3.1128e−001,
A8 = −2.4095e−001, A10 = 1.4896e−001, A12 = −4.7664e−003
Eighth surface K = −9.0000e+001, A4 = −1.0588e−001, A6 = −7.9917e−002,
A8 = 1.2471e−001, A10 = −5.6236e−002, A12 = 5.3750e−004,
A14 = 2.4420e−003
Ninth surface K = −5.4049e+000, A4 = −1.2955e−001, A6 = 6.0654e−002,
A8 = −2.0328e−002, A10 = 4.2656e−003, A12 = −6.2034e−004,
A14 = 4.1973e−005

Various Data

| | |
|---|---|
| focal length (f) | 2.536 (mm) |
| F-number (Fno) | 2.800 |
| angle of view (w) | 44.190 (mm) |
| image height (maximum) (y max) | 2.434 (mm) |
| back focus (Bf) | 1.118 (mm) |
| total length of lens system (TL) | 3.908 (mm) |

Focal length of each lens element (mm)

| | |
|---|---|
| first lens element L1 | 2.939 |
| second lens element L2 | −2.669 |
| third lens element L3 | 1.021 |
| fourth lens element L4 | −1.128 |

Next, construction data of the respective lens elements in the imaging optical system 1C as Example 3 are shown below.

Numerical Data in Example 3

Unit: mm

Lens Surface Data

| lens surface | r | d | nd | vd |
|---|---|---|---|---|
| object plane | ∞ | ∞ | | |
| 1 (aperture stop) | ∞ | 0.055 | | |
| 2* | 3.172 | 0.795 | 1.54470 | 56.15 |
| 3* | −2.244 | 0.222 | | |
| 4* | −2.556 | 0.230 | 1.63469 | 23.87 |
| 5* | −89.331 | 0.493 | | |
| 6* | −1.814 | 0.656 | 1.54470 | 56.15 |
| 7* | −1.006 | 0.050 | | |
| 8* | 1.284 | 0.582 | 1.54470 | 56.15 |
| 9* | 0.752 | 1.300 | | |
| image plane | ∞ | | | |

Aspherical Surface Data

Second surface

K = 6.5752e+000, A4 = −8.7112e−002, A6 = −1.4833e−001,
A8 = 1.6270e−001, A10 = −2.7020e−001
Third surface K = 3.3148e+000, A4 = −1.4703e−001, A6 = 5.6020e−002,
A8 = 5.9613e−002, A10 = −7.1547e−002

-continued

Unit: mm

Fourth surface

K = −3.1503e+001, A4 = −5.2810e−001, A6 = 6.9543e−001,
A8 = −2.4006e−001, A10 = −1.6901e−001, A12 = 1.1403e−001
Fifth surface K = −4.8877e+001, A4 = −1.4082e−001, A6 = 1.9486e−001,
A8 = 2.1007e−002, A10 = −1.4125e−001, A12 = 4.9751e−002
Sixth surface K = −1.9352e+001, A4 = −9.4102e−002, A6 = 1.2406e−001,
A8 = −2.8863e−001, A10 = 2.9268e−001, A12 = −1.0157e−001
Seventh surface K = −4.1515e+000, A4 = −2.1687e−001, A6 = 2.8104e−001,
A8 = −3.1870e−001, A10 = 1.8798e−001, A12 = −3.9362e−002
Eighth surface K = −4.8600e+000, A4 = −6.3578e−002, A6 = −3.0697e−002,
A8 = 4.7119e−002, A10 = −2.8292e−002, A12 = 8.8185e−003,
A14 = −1.1760e−003
Ninth surface K = −3.3220e+000, A4 = −9.8387e−002, A6 = 5.3402e−002,
A8 = −2.5612e−002, A10 = 7.7164e−003, A12 = −1.2631e−003,
A14 = 8.1683e−005

Various Data

| | |
|---|---|
| focal length (f) | 2.941 (mm) |
| F-number (Fno) | 2.000 |
| angle of view (w) | 39.052 (mm) |
| image height (maximum) (y max) | 2.434 (mm) |
| back focus (Bf) | 1.300 (mm) |
| total length of lens system (TL) | 4.384 (mm) |

Focal length of each lens element (mm)

| | |
|---|---|
| first lens element L1 | 2.544 |
| second lens element L2 | −4.151 |
| third lens element L3 | 3.226 |
| fourth lens element L4 | −5.428 |

The imaging optical system 1C as Example 3 is a particularly fast imaging optical system whose F-number is 2 or less. In recent years, there has been spread a high-pixel imaging element 17, SR of a high class (high grade) having the pixel number in the range of about 8 to 16 Megapixels e.g. 8 megapixels, 10 megapixels, or 16 megapixels. In the case where the size of the imaging element 17, SR is fixed, the pixel pitch is narrowed (the pixel area is reduced), as compared with a conventional imaging element. As a result, the imaging optical system 1 requires a transmitted light amount in accordance with the narrowed pixel pitch. The imaging optical system 1C as Example 3 has an F-number of 2 or less, which provides a fast optical system. Thus, the imaging optical system 1C is advantageously used for such a high-pixel imaging element 17, SR having the pixel number in the range of from 8 megapixels to 16 megapixels.

Next, construction data of the respective lens elements in the imaging optical system 1D as Example 4 are shown below.

Numerical Data in Example 4

Unit: mm

Lens Surface Data

| lens surface | r | d | nd | νd |
|---|---|---|---|---|
| object plane | ∞ | ∞ | | |
| 1 (aperture stop) | ∞ | 0.070 | | |
| 2* | 3.358 | 0.653 | 1.54470 | 56.15 |
| 3* | −1.989 | 0.389 | | |
| 4* | −1.253 | 0.291 | 1.63469 | 23.87 |
| 5* | −4.026 | 0.248 | | |
| 6* | −52.273 | 0.750 | 1.54470 | 56.15 |
| 7* | −1.038 | 0.252 | | |
| 8* | 2.627 | 0.416 | 1.54470 | 56.15 |
| 9* | 0.788 | 1.110 | | |
| image plane | ∞ | | | |

Aspherical Surface Data second surface

K = −2.6077e+000, A4 = −1.1952e−001, A6 = −9.3187e−002,
A8 = −1.2283e−001, A10 = −2.5081e−001
third surface K = 2.8526e+000, A4 = −1.1855e−001, A6 = −8.6994e−002,
A8 = 2.8101e−001, A10 = −3.2919e−001
fourth surface K = −8.4242e+000, A4 = −5.5746e−001, A6 = 8.9087e−001,
A8 = −2.1025e−001, A10 = −4.7462e−001, A12 = 2.9481e−001
fifth surface K = −1.6683e+001, A4 = −1.4123e−001, A6 = 2.4849e−001,
A8 = −8.2334e−003, A10 = −1.2869e−001, A12 = 4.3011e−002
sixth surface K = −9.0000e+001, A4 = −1.2128e−001, A6 = 1.7167e−001,
A8 = −2.9794e−001, A10 = 2.7435e−001, A12 = −9.6374e−002
seventh surface K = −3.2207e+000, A4 = −1.4159e−001, A6 = 2.3199e−001,
A8 = −3.1249e−001, A10 = 2.0824e−001, A12 = −4.7847e−002
eighth surface K = −6.0102e+001, A4 = −1.6058e−001, A6 = 1.9460e−003,
A8 = 4.5282e−002, A10 = −2.8771e−002, A12 = 9.5274e−003,
A14 = −1.6555e−003
ninth surface K = −4.1253e+000, A4 = −1.5754e−001, A6 = 7.9929e−002,
A8 = −3.1247e−002, A10 = 7.8572e−003, A12 = −1.1691e−003,
A14 = 7.6183e−005

Various Data

| | |
|---|---|
| focal length (f) | 2.957 (mm) |
| F-number (Fno) | 2.800 |
| angle of view (w) | 38.885 (mm) |
| image height (maximum) (y max) | 2.434 (mm) |
| back focus (Bf) | 1.110 (mm) |
| total length of lens system (TL) | 4.180 (mm) |

Focal length of each lens element (mm)

| | |
|---|---|
| first lens element L1 | 2.397 |
| second lens element L2 | −2.987 |
| third lens element L3 | 1.934 |
| fourth lens element L4 | −2.247 |

Next, construction data of the respective lens elements in the imaging optical system 1E as Example 5 are shown below.

Numerical Data in Example 5

Unit: mm

Lens Surface Data

| lens surface | r | d | nd | vd |
|---|---|---|---|---|
| object plane | ∞ | ∞ | | |
| 1 (aperture stop) | ∞ | 0.090 | | |
| 2* | 5.754 | 0.747 | 1.54470 | 56.15 |
| 3* | −1.527 | 0.436 | | |
| 4* | −0.757 | 0.230 | 1.63469 | 23.87 |
| 5* | −2.241 | 0.050 | | |
| 6* | 443.703 | 0.763 | 1.54470 | 56.15 |
| 7* | −1.010 | 0.050 | | |
| 8* | 1.077 | 0.454 | 1.54470 | 56.15 |
| 9* | 0.653 | 1.313 | | |
| image plane | ∞ | | | |

Aspherical Surface Data second surface

K = −2.1291e+001, A4 = −1.3657e−001, A6 = −1.4946e−002,
A8 = −5.6401e−001, A10 = 4.4961e−001 third surface

K = 1.9894e+000, A4 = −4.4463e−002, A6 = −1.1963e−001,
A8 = 3.9552e−001, A10 = −1.6226e−001 fourth surface

K = −4.7855e+000, A4 = −7.2812e−001, A6 = 9.7632e−001,
A8 = −3.4747e−002, A10 = −5.2775e−001, A12 = 2.0523e−001 fifth surface

K = −1.3902e+001, A4 = −2.1029e−001, A6 = 2.3853e−001,
A8 = 7.8474e−003, A10 = −1.1178e−001, A12 = 3.4535e−002 sixth surface

K = 9.0000e+001, A4 = −2.1125e−001, A6 = 3.5350e−001,
A8 = −3.5115e−001, A10 = 2.2789e−001, A12 = −6.6520e−002 seventh surface

K = −2.0312e+000, A4 = −1.2445e−001, A6 = 2.5404e−001,
A8 = −3.0164e−001, A10 = 2.1973e−001, A12 = −5.7328e−002 eighth surface

K = −6.3305e+000, A4 = −7.5624e−002, A6 = −3.9579e−002,
A8 = 5.4165e−002, A10 = −2.8639e−002, A12 = 8.3856e−003,
A14 = −1.2101e−003 ninth surface

K = −2.8884e+000, A4 = −1.4238e−001, A6 = 7.6812e−002,
A8 = −3.1720e−002, A10 = 8.8866e−003, A12 = −1.4672e−003,
A14 = 9.8430e−005

Various Data

| | |
|---|---|
| focal length (f) | 2.535 (mm) |
| F-number (Fno) | 2.800 |
| angle of view (w) | 44.594 (mm) |
| image height (maximum) (y max) | 2.434 (mm) |
| back focus (Bf) | 1.313 (mm) |
| total length of lens system (TL) | 4.133 (mm) |

Focal length of each lens element (mm)

| | |
|---|---|
| first lens element L1 | 2.298 |
| second lens element L2 | −1.915 |
| third lens element L3 | 1.851 |
| fourth lens element L4 | −4.892 |

Next, construction data of the respective lens elements in the imaging optical system 1F as Example 6 are shown below.

Numerical Data in Example 6

Unit: mm

Lens Surface Data

| lens surface | r | d | nd | vd |
|---|---|---|---|---|
| object plane | ∞ | ∞ | | |
| 1 (aperture stop) | ∞ | 0.039 | | |
| 2* | 2.295 | 0.531 | 1.54470 | 56.15 |
| 3* | −7.121 | 0.305 | | |
| 4* | −27.157 | 0.309 | 1.63469 | 23.87 |
| 5* | 2.048 | 0.140 | | |
| 6* | 9.756 | 0.933 | 1.54470 | 56.15 |
| 7* | −0.538 | 0.050 | | |
| 8* | −1000.000 | 0.420 | 1.54470 | 56.15 |
| 9* | 0.625 | 1.069 | | |
| image plane | ∞ | | | |

Aspherical Surface Data second surface

K = −6.6468e+000, A4 = −9.8136e−002, A6 = 3.9837e−001,
A8 = −1.5006e+000, A10 = 1.3070e+000 third surface

K = 7.6989e+001, A4 = −2.8269e−001, A6 = 7.3396e−002,
A8 = −2.2797e−001, A10 = 3.0546e−001 fourth surface

K = 9.0000e+001, A4 = −7.9868e−001, A6 = 7.9493e−002,
A8 = 1.1196e−001, A10 = 1.5519e+000, A12 = −1.4076e+000 fifth surface

K = −2.2328e+001, A4 = −3.5435e−001, A6 = 6.6078e−002,
A8 = 2.1063e−001, A10 = −1.5198e−001, A12 = 5.0563e−003 sixth surface

K = −9.0000e+001, A4 = −2.2810e−001, A6 = 3.7168e−001,
A8 = −4.2824e−001, A10 = 3.4004e−001, A12 = −1.2098e−001 seventh surface

K = −2.9545e+000, A4 = −3.1932e−001, A6 = 3.6738e−001,
A8 = −3.2191e−001, A10 = 2.4132e−001, A12 = −6.3200e−002 eighth surface

K = −9.0000e+001, A4 = 2.0753e−002, A6 = −9.0715e−002,
A8 = 6.7408e−002, A10 = −2.8842e−002, A12 = 7.4100e−003,
A14 = −8.0302e−004 ninth surface

K = −5.1814e+000, A4 = −9.4583e−002, A6 = 4.8847e−002,
A8 = −3.0242e−002, A10 = 1.1189e−002, A12 = −2.1166e−003,
A14 = 1.5791e−004

Various Data

| | |
|---|---|
| focal length (f) | 2.393 (mm) |
| F-number (Fno) | 2.400 |
| angle of view (w) | 46.246 (mm) |
| image height (maximum) (y max) | 2.390 (mm) |
| back focus (Bf) | 1.069 (mm) |
| total length of lens system (TL) | 3.798 (mm) |

Focal length of each lens element (mm)

| | |
|---|---|
| first lens element L1 | 3.237 |
| second lens element L2 | −2.959 |
| third lens element L3 | 0.964 |
| fourth lens element L4 | −1.142 |

Next, construction data of the respective lens elements in the imaging optical system 1G as Example 7 are shown below.

Next, construction data of the respective lens elements in the imaging optical system 1H as Example 8 are shown below.

Numerical Data in Example 7

Unit: mm

Lens Surface Data

| lens surface | r | d | nd | νd |
|---|---|---|---|---|
| object plane | ∞ | ∞ | | |
| 1 (aperture stop) | ∞ | 0.092 | | |
| 2* | 6.031 | 0.530 | 1.54470 | 56.15 |
| 3* | −2.083 | 0.438 | | |
| 4* | −1.454 | 0.230 | 1.63469 | 23.87 |
| 5* | 125.535 | 0.050 | | |
| 6* | 11.893 | 0.961 | 1.54470 | 56.15 |
| 7* | −0.922 | 0.050 | | |
| 8* | 0.976 | 0.400 | 1.54470 | 56.15 |
| 9* | 0.546 | 1.373 | | |
| image plane | ∞ | | | |

Aspherical Surface Data second surface $K = -5.3418e+001, A4 = -1.5314e-001, A6 = 1.2338e-001,$
$A8 = -1.2635e+000, A10 = 1.9425e+000$ third surface $K = 3.9305e+000, A4 = -1.1838e-001, A6 = -8.6798e-002,$
$A8 = 2.7931e-001, A10 = -1.5761e-001$ fourth surface $K = -2.1904e+001, A4 = -7.5775e-001, A6 = 8.3104e-001,$
$A8 = 1.2245e-002, A10 = -2.8656e-001, A12 = 1.4898e-002$ fifth surface $K = -9.0000e+001, A4 = -2.5978e-001, A6 = 2.3710e-001,$
$A8 = 2.7824e-002, A10 = -1.1726e-001, A12 = 2.4754e-002$ sixth surface $K = 9.0000e+001, A4 = -1.8336e-001, A6 = 3.7154e-001,$
$A8 = -3.6666e-001, A10 = 2.1927e-001, A12 = -6.1543e-002$ seventh surface $K = -2.0701e+000, A4 = -1.3205e-001, A6 = 2.5582e-001,$
$A8 = -2.9782e-001, A10 = 2.2015e-001, A12 = -5.6880e-002$ eighth surface $K = -6.6714e+000, A4 = -6.9521e-002, A6 = -4.2778e-002,$
$A8 = 5.4614e-002, A10 = -2.7266e-002, A12 = 7.4122e-003,$
$A14 = -9.9310e-004$ ninth surface $K = -2.7099e+000, A4 = -1.5460e-001, A6 = 8.6956e-002,$
$A8 = -3.5678e-002, A10 = 9.5859e-003, A12 = -1.4857e-003,$
$A14 = 9.2969e-005$

Various Data

| | |
|---|---|
| focal length (f) | 2.535 (mm) |
| F-number (Fno) | 2.800 |
| angle of view (w) | 44.579 (mm) |
| image height (maximum) (y max) | 2.434 (mm) |
| back focus (Bf) | 1.373 (mm) |
| total length of lens system (TL) | 4.125 (mm) |

Focal length of each lens element (mm)

| | |
|---|---|
| first lens element L1 | 2.909 |
| second lens element L2 | −2.264 |
| third lens element L3 | 1.614 |
| fourth lens element L4 | −3.382 |

Numerical Data in Example 8

Unit: mm

Lens Surface Data

| lens surface | r | d | nd | νd |
|---|---|---|---|---|
| object plane | ∞ | ∞ | | |
| 1* | 3.561 | 0.421 | 1.54470 | 56.15 |
| 2* | −4.752 | −0.005 | | |
| 3 (aperture stop) | ∞ | 0.507 | | |
| 4* | −4.145 | 0.270 | 1.63469 | 23.87 |
| 5* | 2.805 | 0.050 | | |
| 6* | 8.315 | 1.082 | 1.54470 | 56.15 |
| 7* | −0.851 | 0.050 | | |
| 8* | 1.040 | 0.400 | 1.54470 | 56.15 |
| 9* | 0.549 | 1.3571 | | |
| image plane | ∞ | | | |

Aspherical Surface Data first surface $K = 1.8171e+001, A4 = -1.3883e-001, A6 = -2.0287e-001,$
$A8 = 1.1037e-001, A10 = -4.6731e-001$ second surface $K = -3.8314e+001, A4 = -1.8390e-001, A6 = -2.5883e-001,$
$A8 = 6.3256e-001, A10 = -9.4019e-001$ fourth surface $K = 2.1624e+001, A4 = -6.0941e-001, A6 = 7.1699e-001,$
$A8 = -6.2853e-001, A10 = -9.2867e-001, A12 = 1.2861e+000$ fifth surface $K = -9.0000e+001, A4 = -3.2546e-001, A6 = 3.5043e-001,$
$A8 = -2.0668e-001, A10 = -1.6468e-001, A12 = 1.4187e-001$ sixth surface $K = -3.6879e+001, A4 = -1.3624e-001, A6 = 3.2628e-001,$
$A8 = -3.6534e-001, A10 = 2.2437e-001, A12 = -5.2067e-002$ seventh surface $K = -3.2944e+000, A4 = -2.4190e-001, A6 = 2.5809e-001,$
$A8 = -2.6910e-001, A10 = 1.8941e-001, A12 = -3.9948e-002$ eighth surface $K = -3.7483e+000, A4 = -1.4530e-001, A6 = -1.4589e-002,$
$A8 = 4.6366e-002, A10 = -2.3103e-002, A12 = 5.1407e-003,$
$A14 = -4.0592e-004$ ninth surface $K = -2.5349e+000, A4 = -1.6754e-001, A6 = 8.5564e-002,$
$A8 = -3.1940e-002, A10 = 7.8447e-003, A12 = -1.1504e-003,$
$A14 = 7.2555e-005$

Various Data

| | |
|---|---|
| focal length (f) | 2.535 (mm) |
| F-number (Fno) | 2.800 |
| angle of view (w) | 44.324 (mm) |
| image height (maximum) (y max) | 2.434 (mm) |
| back focus (Bf) | 1.357 (mm) |
| total length of lens system (TL) | 4.133 (mm) |

Focal length of each lens element (mm)

| | |
|---|---|
| first lens element L1 | 3.805 |
| second lens element L2 | −2.596 |
| third lens element L3 | 1.479 |
| fourth lens element L4 | −2.995 |

Next, construction data of the respective lens elements in the imaging optical system 1I as Example 9 are shown below.

Numerical Data in Example 9

Unit: mm

Lens Surface Data

| lens surface | r | d | nd | vd |
|---|---|---|---|---|
| object plane | ∞ | ∞ | | |
| 1 (aperture stop) | ∞ | 0.066 | | |
| 2* | 2.593 | 0.721 | 1.54470 | 56.15 |
| 3* | −1.516 | 0.335 | | |
| 4* | −0.688 | 0.413 | 1.63469 | 23.87 |
| 5* | −1.746 | 0.050 | | |
| 6* | 4.054 | 0.569 | 1.54470 | 56.15 |
| 7* | −1.665 | 0.052 | | |
| 8* | 1.129 | 0.390 | 1.54470 | 56.15 |
| 9* | 0.663 | 1.102 | | |
| image plane | ∞ | | | |

Aspherical Surface Data second surface

K = −2.6167e+001, A4 = −1.3843e−002, A6 = 6.6185e−002, A8 = −2.2487e+000, A10 = 3.3092e+000
third surface K = 1.3404e+000, A4 = −1.2825e−001, A6 = −2.7582e−001, A8 = 1.0503e+000, A10 = −1.1451e+000
fourth surface K = −3.5347e+000, A4 = −6.1618e−001, A6 = 1.4182e+000, A8 = −1.7818e−001, A10 = −1.3677e+000, A12 = 8.3358e−001
fifth surface K = −3.8318e+000, A4 = −6.7111e−002, A6 = 2.7159e−001, A8 = −4.4531e−003, A10 = −7.2669e−002, A12 = 2.4874e−002
sixth surface K = 4.2126e+000, A4 = −1.4113e−001, A6 = 3.6733e−001, A8 = −4.6435e−001, A10 = 2.6402e−001, A12 = −6.1567e−002
seventh surface K = −1.4220e+000, A4 = 3.6606e−002, A6 = 3.4651e−001, A8 = −3.8031e−001, A10 = 1.6704e−001, A12 = −2.7598e−002
eighth surface K = −9.3481e+000, A4 = −2.1989e−001, A6 = 4.6513e−002, A8 = 4.3422e−002, A10 = −3.1836e−002, A12 = 9.4895e−003, A14 = −1.1218e−003
ninth surface K = −3.3563e+000, A4 = −2.1162e−001, A6 = 1.1790e−001, A8 = −4.7528e−002, A10 = 1.2668e−002, A12 = −2.0994e−003, A14 = 1.6122e−004

Various Data

| focal length (f) | 2.488 (mm) |
|---|---|
| F-number (Fno) | 2.800 |
| angle of view (w) | 44.437 (mm) |
| image height (maximum) (y max) | 2.434 (mm) |
| back focus (Bf) | 1.102 (mm) |
| total length of lens system (TL) | 3.697 (mm) |

Focal length of each lens element (mm)

| first lens element L1 | 1.873 |
|---|---|
| second lens element L2 | −2.109 |
| third lens element L3 | 2.245 |
| fourth lens element L4 | −4.181 |

In the aforementioned examples, the total length (TL) of the lens system (optical system) in the aforementioned construction data is the total length of the lens system in the case where the object is located at an infinite distance, namely, corresponds to the distance from the object-side surface of the first lens element to the imaging surface.

Figure 5:
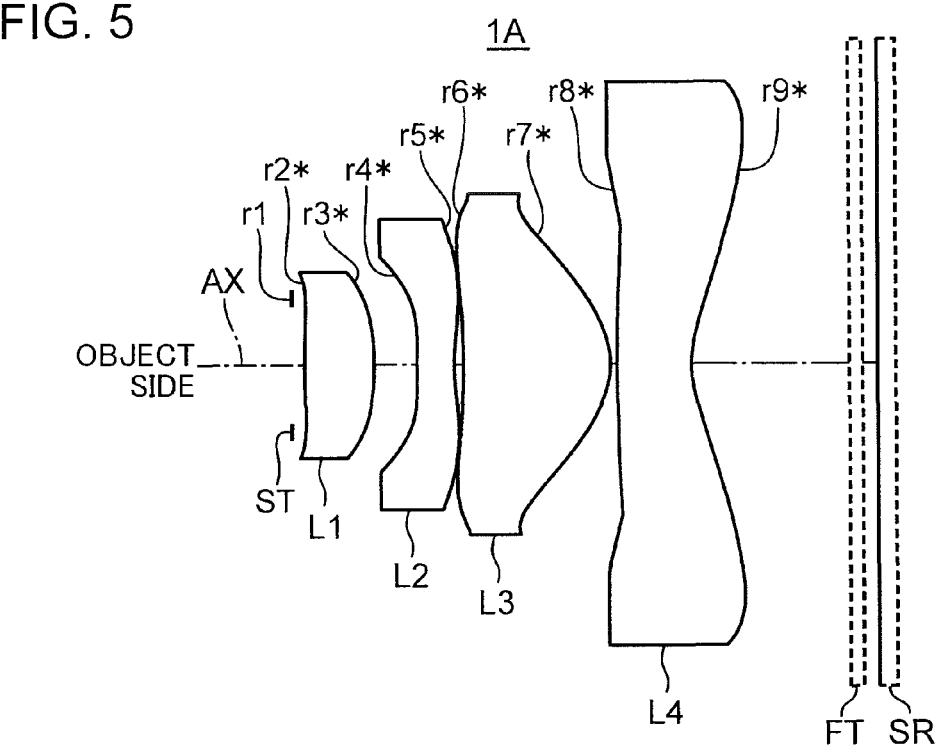
FIG. 5 is a cross-sectional view showing an arrangement of lens elements in an imaging optical system as Example 1.
Figure 6:
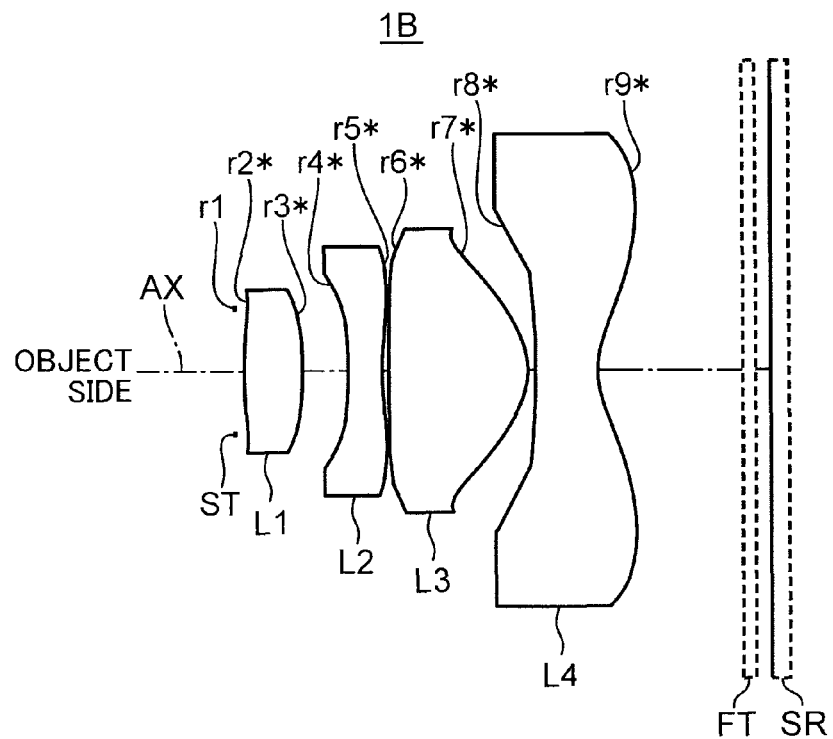
FIG. 6 is a cross-sectional view showing an arrangement of lens elements in an imaging optical system as Example 2.
Figure 7:
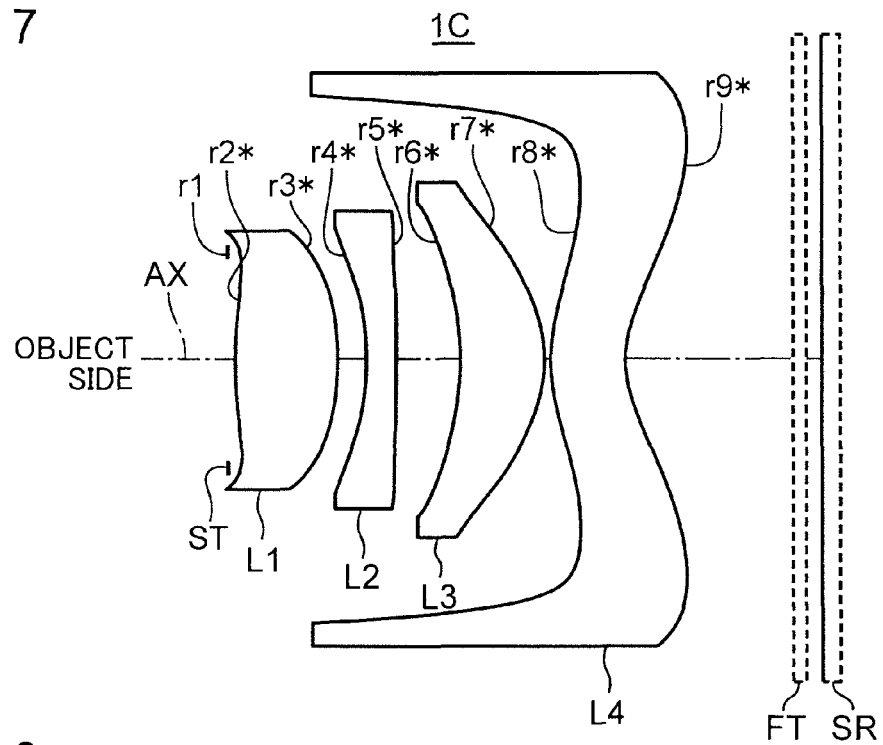
FIG. 7 is a cross-sectional view showing an arrangement of lens elements in an imaging optical system as Example 3.
Figure 8:
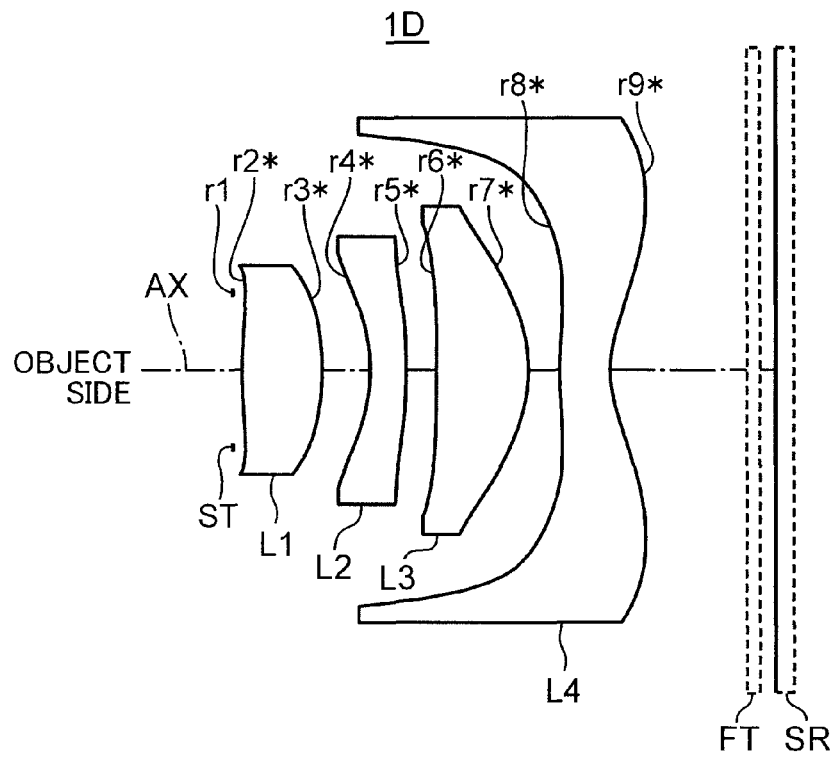
FIG. 8 is a cross-sectional view showing an arrangement of lens elements in an imaging optical system as Example 4.
Figure 9:
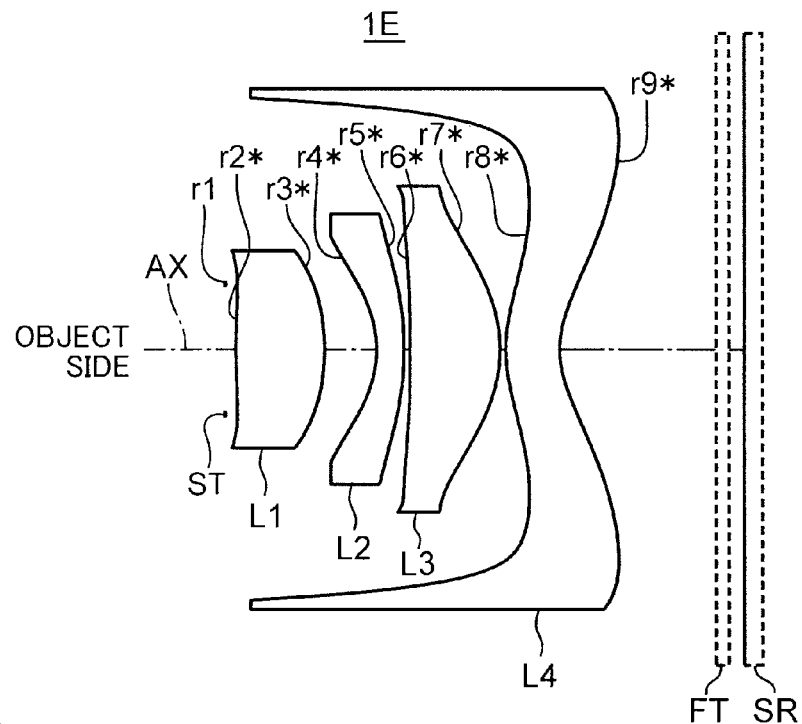
FIG. 9 is a cross-sectional view showing an arrangement of lens elements in an imaging optical system as Example 5.
Figure 10:
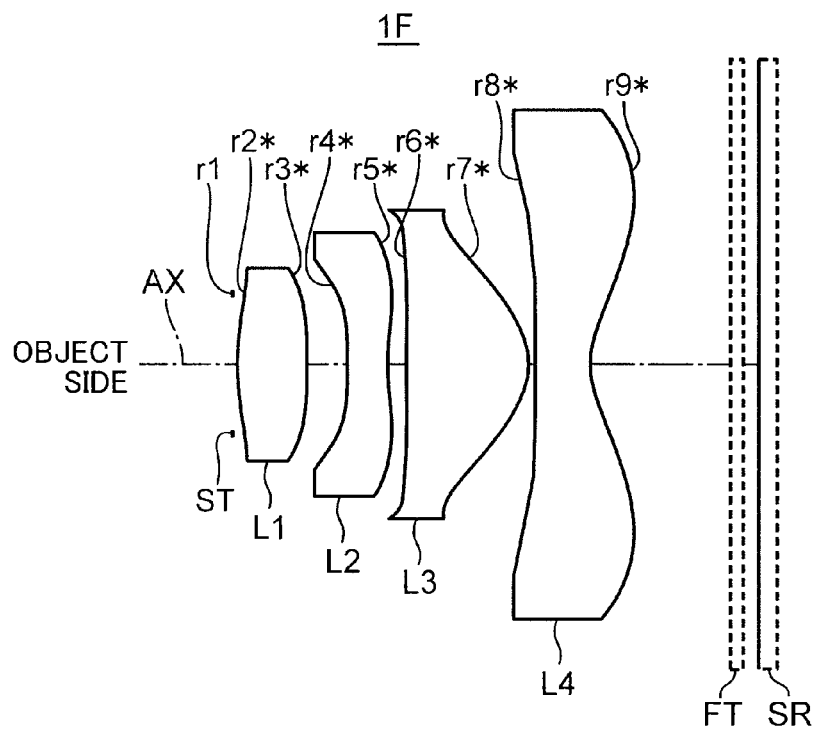
FIG. 10 is a cross-sectional view showing an arrangement of lens elements in an imaging optical system as Example 6.
Figure 11:
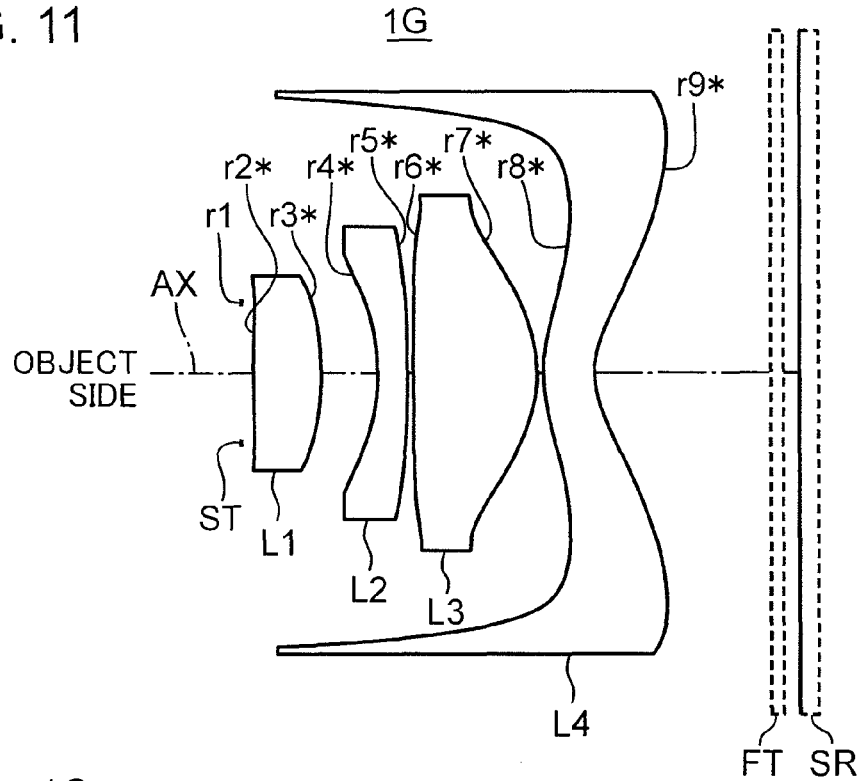
FIG. 11 is a cross-sectional view showing an arrangement of lens elements in an imaging optical system as Example 7.
Figure 12:
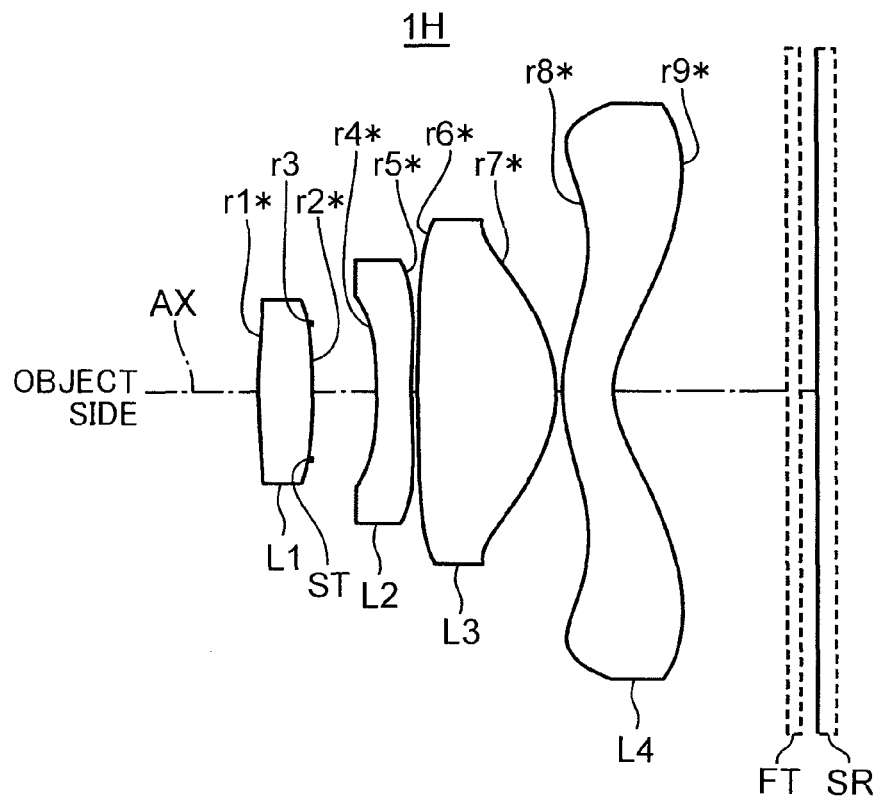
FIG. 12 is a cross-sectional view showing an arrangement of lens elements in an imaging optical system as Example 8.
Figure 13:
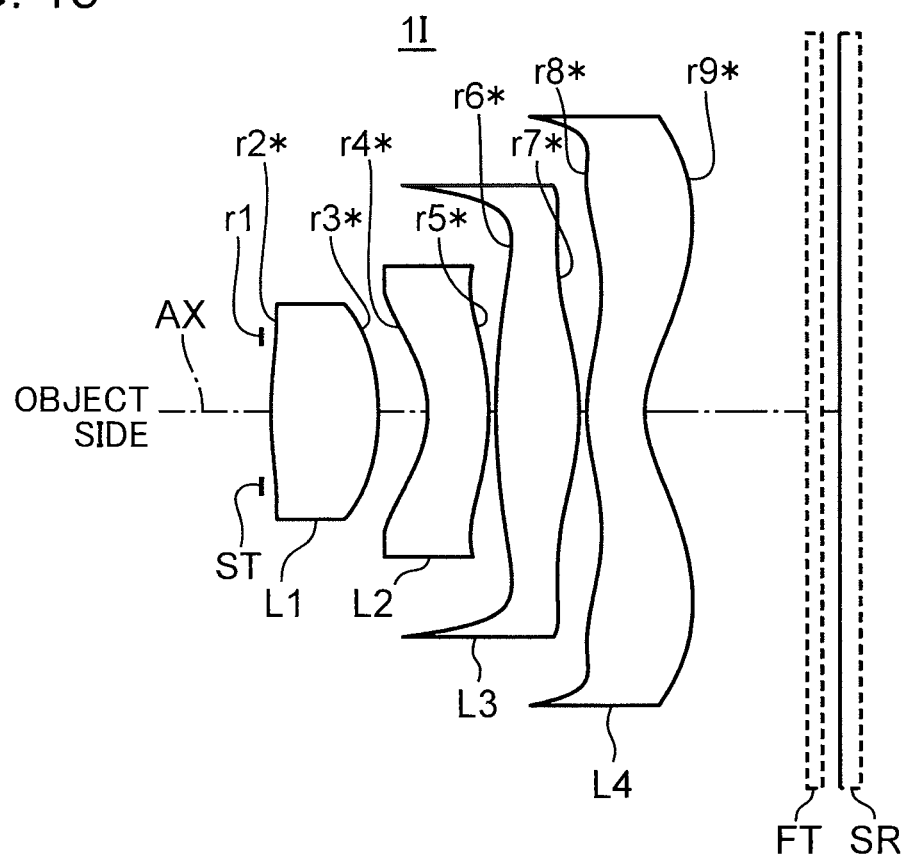
FIG. 13 is a cross-sectional view showing an arrangement of lens elements in an imaging optical system as Example 9.
Figure 16A:
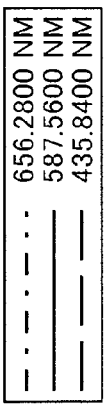
FIGS. 16A, 16B, 16C are longitudinal aberration diagrams of the imaging optical system as Example 3.
Figure 16B:
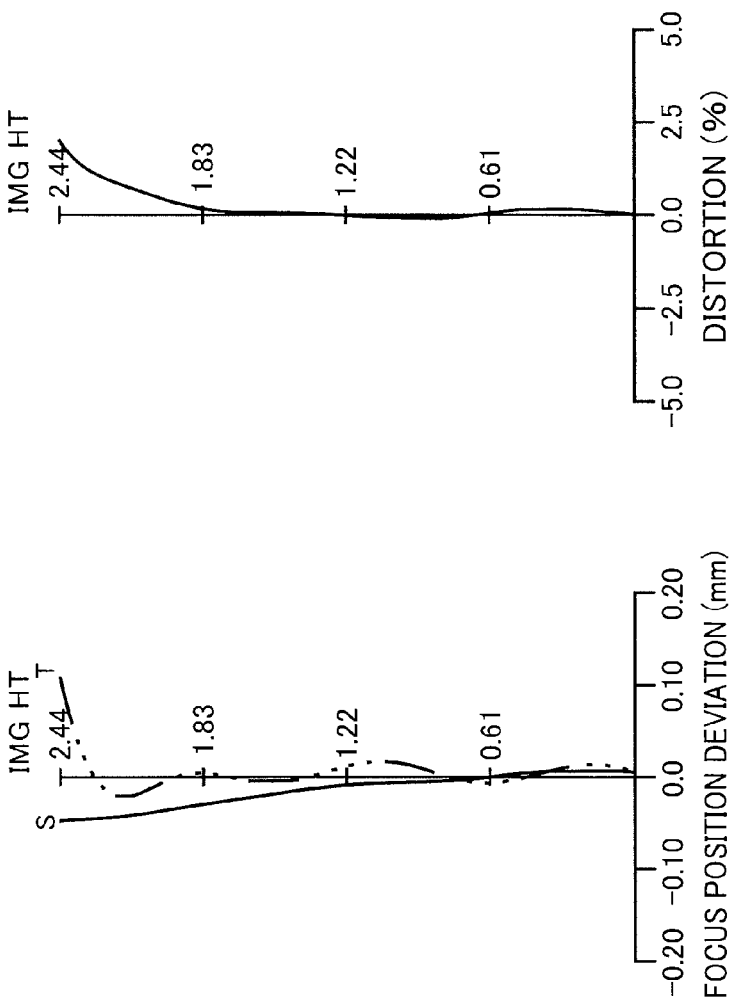
Figure 16C:
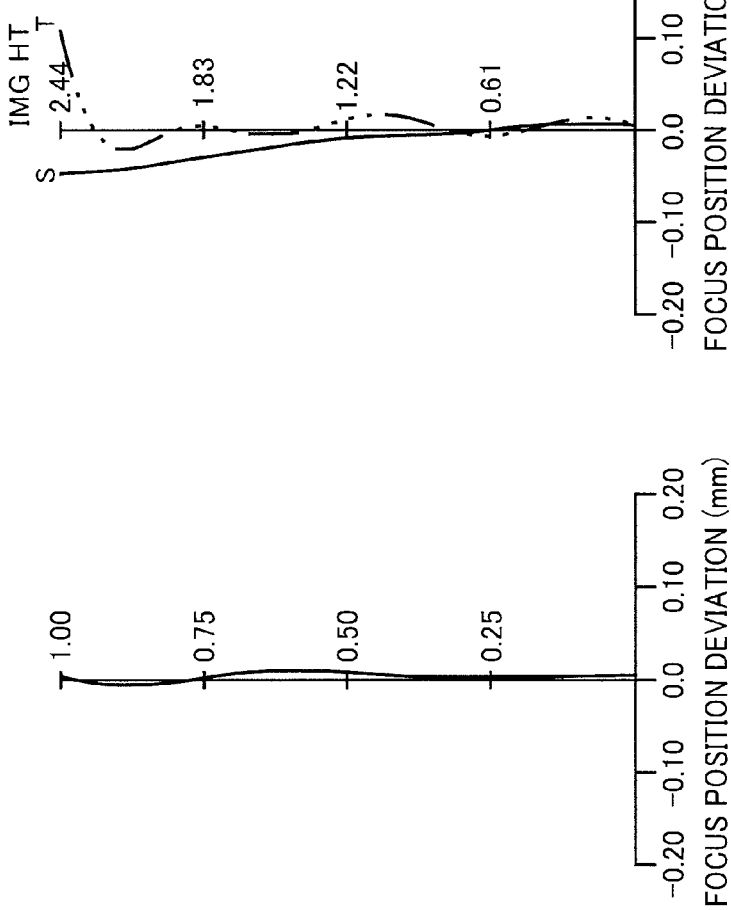
Figure 22A:
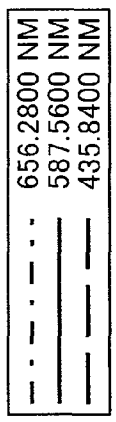
FIGS. 22A, 22B, 22C are longitudinal aberration diagrams of the imaging optical system as Example 9.
Figure 22B:
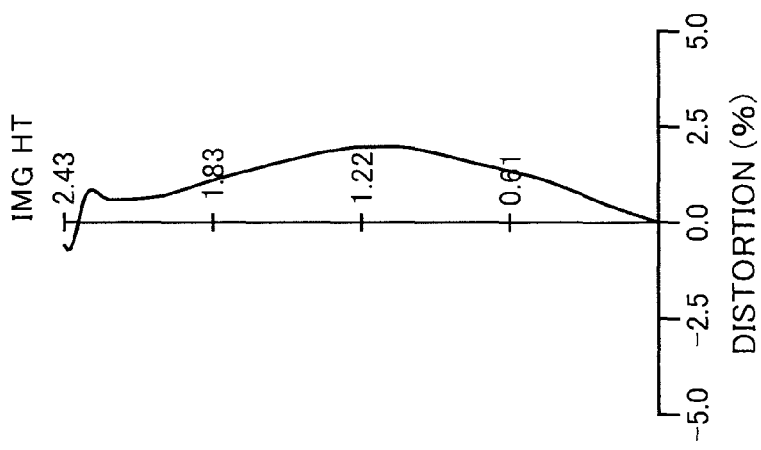
Figure 22C:
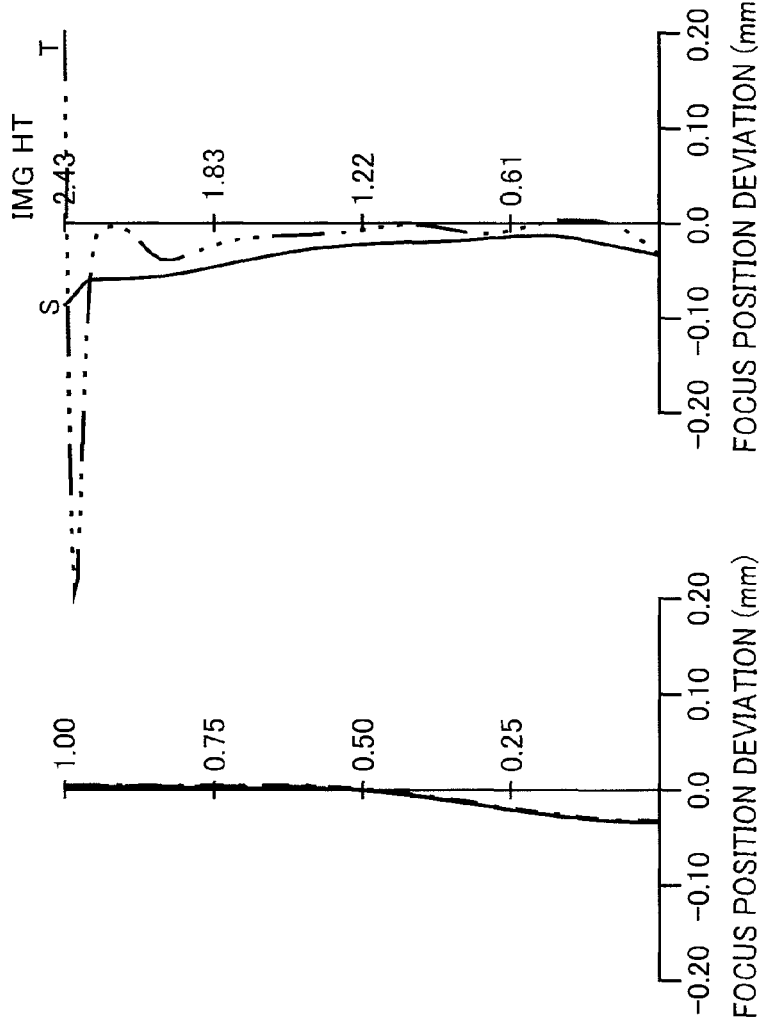

In the aforementioned surface data, the lens surface No. corresponds to the number "i" in the symbol "ri" (i=1, 2, 3, . . . ) attached to each of the lens surfaces shown in FIGS. 5 and 13. The surface attached with the asterisk "*" to the number "i" indicates an aspherical surface (a dioptric surface having an aspherical configuration, or a surface having a refractive function substantially equivalent to an aspherical surface).

Further, "r" denotes a curvature radius (unit: mm) of each surface, "d" denotes a lens surface interval on an optical axis (on-axis surface interval) in an infinity in-focus state (a focus state at an infinite distance), "nd" denotes a refractive index of each lens element for a d-line (wavelength: 587.56 nm), and "vd" denotes an Abbe number. Since the surface of the optical diaphragm ST, and the light receiving surface of the imaging element SR are flat surfaces, curvature radii of these surfaces are ∞ (infinite). Further, the curvature radii of both surfaces of a parallel plate FT, which is disposed as necessary, are ∞ (infinite).

The aforementioned aspherical surface data shows the values of a second-order curved surface parameter (conical coefficient K) and of an aspherical coefficient Ai (i=4, 6, 8, 10, 12, 14, 16) of each surface defined as an aspherical surface (the surface attached with the asterisk "*" to the number "i" in the surface data).

In each of Examples 1 through 9, the aspherical configuration is defined by the following conditional expression, where a surface vertex is represented as the point of origin, X axis represents an optical axis direction, and h denotes the height in a vertical direction with respect to the optical axis.

$$X = (h^2/R)/[1 + (1 - (1+K)h^2/R^2)^{1/2}] + A_i h^i$$

where $A_i$ is the i-th-order aspherical coefficient, R is a reference curvature radius, and K is a conical constant.

Regarding paraxial curvature radii (r) described in the claims, the basic idea, and Examples 1 through 9, in actual lens measurement, it is possible to regard an approximate curvature radius obtained by processing a shape measurement value of a vicinity of the lens center (more specifically, a shape measurement value of a center area corresponding to 10% or less with respect to the lens outer diameter) with use of a least square algorithm, as a paraxial curvature radius. Further, in the case where a second-order aspherical coefficient is employed, it is possible to regard a curvature radius, taking into consideration of a second-order aspherical coefficient on the basis of a reference curvature radius described in a definition expression defining an aspherical surface, as a paraxial curvature radius In the aforementioned aspherical surface data, the symbol "En" means ten to the power of n. For instance, "E+001" means ten to the power of +1, and "E−003" means ten to the power of −3.

The respective aberrations of the imaging optical systems 1A through 1I as Examples 1 through 9 having the aforementioned lens arrangements and constructions are respectively shown in FIGS. 14A through 22C.

FIGS. 14A through 22C are longitudinal aberration diagrams at an infinite distance. FIGS. 14A, 15A, 16A, 17A, 18A, 19A, 20A, 21A, and 22A show longitudinal spherical aberrations (sine condition), FIGS. 14B, 15B, 16B, 17B, 18B, 19B, 20B, 21B, and 22B show astigmatism field curves, and FIGS. 14C, 15C, 16C, 17C, 18C, 19C, 20C, 21C, and 22C show distortions. A horizontal axis of spherical aberration represents a focus position deviation in mm, and a vertical axis thereof represents a normalized value at a maximum incident height. A horizontal axis of astigmatism field curves represents a focus position deviation in mm, and a vertical axis thereof represents an image height in mm. A horizontal axis of distortion represents a ratio (%) of an actual image height to an ideal image height, and a vertical axis thereof represents an image height in mm. In graphs of spherical aberration, the solid line indicates results on a d-line (wavelength: 587.56 nm), the broken line indicates results on a g-line (wavelength: 435.84 nm), and the one-dotted chain line indicates results on a C-line (wavelength: 656.28 nm), respectively. In graphs of astigmatism field curves, the broken line and the solid line respectively indicate results on a tangential (meridional) surface (T) and a sagittal (radial) surface (S). The graphs of astigmatism field curves and distortion show results in the case of using the d-line (wavelength: 587.56 nm).

Table 1 shows values of the conditional expressions (1) through (15) in the case where the conditional expressions (1) to (15) are applied to the imaging optical systems 1A to 1I as Examples 1 through 9 as described above. Table 1 also shows the total length (L/Y).

TABLE 1

| Conditional expression | Ex 1 | Ex 2 | Ex 3 | Ex 4 | Ex 5 | Ex 6 | Ex 7 | Ex 8 | Ex 9 |
|---|---|---|---|---|---|---|---|---|---|
| (1) f1/f | 1.12 | 1.16 | 0.87 | 0.81 | 0.91 | 1.36 | 1.15 | 1.50 | 0.75 |
| (2) (RS1 + RS2)/(RS1 − RS2) | 0.460 | 0.037 | 0.171 | 0.256 | 0.581 | −0.513 | 0.487 | −0.143 | 0.262 |
| (3) (RS3 + RS4)/(RS3 − RS4) | 0.95 | 0.58 | −1.06 | −1.90 | −2.02 | 0.86 | −0.98 | 0.19 | −2.30 |
| (4) d2/TL | 0.077 | 0.089 | 0.051 | 0.093 | 0.105 | 0.080 | 0.106 | 0.121 | 0.090 |
| (5) 2w | 89.1 | 85.2 | 75.1 | 75.1 | 84.9 | 90.0 | 84.8 | 84.4 | 88.7 |
| (6) ν 4 | 56.2 | 56.2 | 56.2 | 56.2 | 56.2 | 56.2 | 56.2 | 56.2 | 56.2 |
| (7) Y/TL | 0.59 | 0.62 | 0.56 | 0.58 | 0.59 | 0.63 | 0.59 | 0.59 | 0.66 |
| (8) f3/f | 0.42 | 0.40 | 1.10 | 0.65 | 0.73 | 0.40 | 0.64 | 0.58 | 0.90 |
| (9) d4/f | 0.028 | 0.020 | 0.168 | 0.084 | 0.020 | 0.059 | 0.020 | 0.020 | 0.020 |
| (10) ν 1 | 56.2 | 56.2 | 56.2 | 56.2 | 56.2 | 56.2 | 56.2 | 56.2 | 56.2 |
| (11) ν 2 | 23.9 | 23.9 | 23.9 | 23.9 | 23.9 | 23.9 | 23.9 | 23.9 | 23.9 |
| (12) ν 3 | 56.2 | 56.2 | 56.2 | 56.2 | 56.2 | 56.2 | 56.2 | 56.2 | 56.2 |
| (13) ET7/CT7 | 0.378 | 0.369 | 0.467 | 0.400 | 0.400 | 0.354 | 0.400 | 0.400 | 0.535 |
| (14) (RS5 + RS6)/(RS5 − RS6) | 1.229 | 0.905 | 3.492 | 1.041 | 0.995 | 0.895 | 0.856 | 0.814 | 0.418 |
| (15) |RS3/RS4| | 2.70 | 1.08 | 1.41 | 1.69 | 0.40 | 0.32 | 2.90 | 0.75 | 1.71 |

As described above, each of the imaging optical systems 1A through 1I as Examples 1 through 9 has a four lens construction, and satisfies the aforementioned conditions. Thus, the imaging optical systems 1A through 1I can advantageously correct various aberrations, while achieving miniaturization, as compared with a conventional optical system. Further, the imaging optical systems 1A through 1I as Examples 1 through 9 can sufficiently achieve miniaturization, when loaded in the imaging device 21 and in the digital apparatus 3, particularly when loaded in the mobile phone 5. Further, it is possible to apply the imaging optical systems 1A through 1I to a high-pixel imaging element 17.

The specification discloses the aforementioned arrangements. The following is a summary of the primary arrangements of the embodiment.

An imaging optical system according to an aspect includes, in the order from an object side toward an image side, a first lens element having a positive refractive power as a whole; a second lens element having a negative refractive power as a whole, a surface position at a maximum effective diameter of the second lens element being located on the object side than a surface vertex of the second lens element; a third lens element having a positive refractive power as a whole; and a fourth lens element having a negative refractive power as a whole, the fourth lens element having an aspherical surface in a contour of a cross section taken along and through an optical axis, the aspherical surface having an inflection point in a direction from the optical axis to an end of an effective area. The imaging optical system satisfies the conditional expressions (1) through (7).

The imaging optical system has a four lens construction with positive, negative, positive, and negative refractive powers. Accordingly, the imaging optical system is advantageous in correcting various aberrations such as spherical aberration and chromatic aberration, and in securing telecentricity. In particular, configuring the second lens element into a predetermined shape in a wide angle lens system satisfying the conditional expression (5) is advantageous in suppressing the angle of light rays incident to the lens surface, and in correcting spherical aberration and coma aberration.

Further, exceeding the upper limit of the conditional expression (1) makes it difficult to shorten the total length TL of the entire optical system, which is not preferable. On the other hand, falling below the lower limit of the conditional expression (1) excessively increases the positive optical power, and makes it difficult to correct spherical aberration or on-axis chromatic aberration, which is not preferable.

Further, exceeding the upper limit or falling below the lower limit of each of the conditional expression (2) and the conditional expression (3) results in an increase of the angle of light rays incident to the lens surface in a wide angle lens system. This makes it difficult to correct spherical aberration and coma aberration, which is not preferable.

Further, exceeding the upper limit of the conditional expression (4) increases the total length TL of the entire optical system and increases the lens diameter. This makes it difficult to correct on-axis chromatic aberration, and lowers the contrast in the vicinity of the center of the image plane, which is not preferable.

Further, falling below the lower limit of the conditional expression (6) makes it difficult to correct chromatic aberration of magnification, which is not preferable.

Further, exceeding the upper limit of the conditional expression (7) makes it difficult to correct spherical aberration, which is not preferable. On the other hand, falling below the lower limit of the conditional expression (7) increases the total length of the entire optical system, and makes it difficult to correct distortion, which is not preferable.

In view of the above, the imaging optical system having the above configuration is advantageous in correcting various aberrations, while achieving miniaturization.

Further, in the imaging optical system, the third lens element may have a biconvex shape, and may satisfy the conditional expression (8).

In the thus-configured imaging optical system, the third lens element has a biconvex shape and the focal length f3 falls in the range defined in the conditional expression (8), whereby the third lens element is operable to share the positive optical power with the first lens element. This is advantageous in securing a wide angle of view, while shortening the total length of the imaging optical system.

Further, in the imaging optical system having the aforementioned configurations, the fourth lens element may be a meniscus lens element having an object-side surface of a convex shape.

In the thus-configured imaging optical system, the fourth lens element is a meniscus lens element having an object-side surface of a convex shape. This is advantageous in easily correcting distortion and controlling the exit pupil position in shortening the total length of the entire optical system.

Further, in the imaging optical system having the aforementioned configurations, the imaging optical system may satisfy the conditional expression (9).

In the thus-configured imaging optical system, exceeding the upper limit of the conditional expression (9) makes it difficult to correct chromatic aberration of magnification of the third lens element, which is not preferable.

In the imaging optical system having the aforementioned configurations, the imaging optical system may satisfy the conditional expressions (10) through (12).

In the thus-configured imaging optical system, setting the Abbe numbers ν1, ν2, and ν3 of the first lens element, the second lens element, and the third lens element respectively in the ranges defined in the conditional expressions (10), (11), and (12) is advantageous in effectively suppressing on-axis chromatic aberration and chromatic aberration of magnification.

Further, in the imaging optical system having the aforementioned configurations, the imaging optical system may satisfy the conditional expressions (13) and (14).

In the thus-configured imaging optical system, exceeding the upper limit of the conditional expression (13) results in insufficient correction of coma aberration and distortion, which is not preferable. On the other hand, falling below the lower limit of the conditional expression (13) results in deterioration of the external appearance in molding, which is not preferable. Further, exceeding the upper limit or falling below the lower limit of the conditional expression (14) makes it difficult to correct distortion and to control the exit pupil position in a wide angle lens system, which is not preferable.

Further, in the imaging optical system having the aforementioned configurations, the imaging optical system may satisfy the conditional expression (15).

In the thus-configured imaging optical system, exceeding the upper limit of the conditional expression (15) makes it difficult to shorten the total length of the entire optical system, which is not preferable. On the other hand, falling below the lower limit of the conditional expression (15) increases the angle of light rays incident to the lens surface, and makes it difficult to correct spherical aberration and coma aberration in a wide angle lens system, which is not preferable.

Further, the imaging optical system having the aforementioned configurations may further include an aperture stop on the object side than the object-side surface of the first lens element.

In the thus-configured imaging optical system, disposing the aperture stop at a position closest to the object side is advantageous in correcting astigmatism and coma aberration.

According to another aspect, an imaging device includes the imaging optical system having one of the aforementioned configurations, and an imaging element which converts an optical image into an electrical signal, wherein the imaging optical system is operable to form an optical image of an object on a light receiving surface of the imaging element.

In the above configuration, it is possible to provide an imaging device incorporated with an imaging optical system capable of advantageously correcting various aberrations, while achieving miniaturization. Accordingly, the thus-configured imaging device enables to form an optical image, in which various aberrations are advantageously corrected, on the light receiving surface of the imaging element, while achieving miniaturization.

According to yet another aspect, a digital apparatus includes the aforementioned imaging device, and a control section which causes the imaging device to perform at least one of a still image photographing and a moving image photographing of the object, wherein the imaging optical system of the imaging device is assembled in such a manner as to form the optical image of the object on an imaging surface of the imaging element. Preferably, the digital apparatus may include a mobile terminal device.

In the aforementioned configuration, it is possible to provide a digital apparatus such as a mobile terminal device incorporated with an imaging optical system capable of advantageously correcting various aberrations while achieving miniaturization. Accordingly, the digital apparatus such as the mobile terminal device enables to form an optical image, in which various aberrations are advantageously corrected, on the light receiving surface of the imaging element, while achieving miniaturization.

This application is based on Japanese Patent Application No. 2012-87293 filed on Apr. 6, 2012, the contents of which are hereby incorporated by reference.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An imaging optical system comprising, in the order from an object side toward an image side:
   a first lens element having a positive refractive power as a whole;
   a second lens element having a negative refractive power as a whole, a surface position at a maximum effective diameter of the second lens element being located on the object side than a surface vertex of the second lens element;
   a third lens element having a positive refractive power as a whole; and
   a fourth lens element having a negative refractive power as a whole, the fourth lens element having an aspherical surface in a contour of a cross section taken along and through an optical axis, the aspherical surface having an inflection point in a direction from the optical axis to an end of an effective area, wherein
   the imaging optical system satisfies the following conditional expressions:

$$0.7 < f1/f < 5 \tag{1}$$

$$-0.8 < (RS1+RS2)/(RS1-RS2)/(RS-RS2) < 3 \tag{2}$$

$-3<(RS3+RS4)/(RS3-RS4)<2$ (3)

$0.03<d2/TL<0.2$ (4)

$2W>72$ (5)

$v4>50$ (6)

$0.55<Y/TL<0.8$ (7)

where
f1: a focal length of the first lens element,
f: a focal length of an entirety of the optical system,
RS1: a curvature radius of an object-side surface of the first lens element,
RS2: a curvature radius of an image-side surface of the first lens element,
RS3: a curvature radius of an object-side surface of the second lens element,
RS4: a curvature radius of an image-side surface of the second lens element,
d2: an optical axis distance between the first lens element and the second lens element,
TL: a total length of the entirety of the optical system (in the case where a parallel plate is disposed, the length of the parallel plate is calculated, assuming that the parallel plate is air),
W: a maximum half angle of view,
v4: an Abbe number of the fourth lens element, and
Y: a maximum image height.

2. The imaging optical system according to claim 1, wherein
the third lens element has a biconvex shape, and satisfies the following conditional expression (8)

$0.3<f3/f<3$ (8)

where
f3: a focal length of the third lens element.

3. The imaging optical system according to claim 1, wherein
the fourth lens element is a meniscus lens element having an object-side surface formed into a convex shape.

4. The imaging optical system according to claim 1, wherein
the imaging optical system satisfies the following conditional expression (9)

$d4/f<0.1$ (9)

where
d4: an optical axis distance between the second lens element and the third lens element.

5. The imaging optical system according to claim 1, wherein
the imaging optical system satisfies the following conditional expressions (10) through (12)

$v1>50$ (10)

$v2<30$ (11)

$v3>50$ (12)

where
v1: an Abbe number of the first lens element,
v2: an Abbe number of the second lens element, and
v3: an Abbe number of the third lens element.

6. The imaging optical system according to claim 1, wherein
the imaging optical system satisfies the following conditional expressions (13) and (14), $0.1<ET7/CT7/0.8$ (13)

$0.1<(RS5+RS6)/(RS5-RS6)<5$ (14)

where
ET7: a thickness of an effective diameter portion of an object-side surface of the third lens element in an optical axis direction,
CT7: an optical axis thickness of the third lens element,
RS5: a curvature radius of the object-side surface of the third lens element, and
RS6: a curvature radius of an image-side surface of the third lens element.

7. The imaging optical system according to claim 1, wherein
the imaging optical system satisfies the following conditional expression (15), $0.2<|RS3/RS4|<4$ (15).

8. The imaging optical system according to claim 1, further comprising:
an aperture stop on the object side than the object-side surface of the first lens element.

9. An imaging device, comprising:
the imaging optical system of claim 1; and
an imaging element which converts an optical image into an electrical signal, wherein
the imaging optical system is operable to form an optical image of an object on a light receiving surface of the imaging element.

10. A digital apparatus, comprising:
the imaging device of claim 9; and
a control section which causes the imaging device to perform at least one of a still image photographing and a moving image photographing of the object, wherein
the imaging optical system of the imaging device is assembled in such a manner as to form the optical image of the object on an imaging surface of the imaging element.

11. The digital apparatus according to claim 10, wherein
the digital apparatus includes a mobile terminal device.

\* \* \* \* \*